US008086666B2

(12) United States Patent
Lo

(10) Patent No.: US 8,086,666 B2
(45) Date of Patent: Dec. 27, 2011

(54) METHOD AND APPARATUS FOR PROGRAMMING PROGRAMMABLE CONTROLLERS AND PROVIDING VERSION MANAGEMENT FROM A CENTRALIZED SERVER

(75) Inventor: George Lo, Plainsboro, NJ (US)

(73) Assignee: Siemens Industry, Inc., Alpharetta, GA (US)

( * ) Notice: Subject to any disclaimer, the term of this patent is extended or adjusted under 35 U.S.C. 154(b) by 1684 days.

(21) Appl. No.: 11/047,057

(22) Filed: Jan. 31, 2005

(65) Prior Publication Data

US 2005/0132064 A1  Jun. 16, 2005

Related U.S. Application Data

(62) Division of application No. 09/961,931, filed on Sep. 24, 2001.

(51) Int. Cl.
G06F 15/16 (2006.01)

(52) U.S. Cl. .............................. 709/203; 709/227; 700/1
(58) Field of Classification Search .............. 709/1, 100, 709/203, 227; 700/1
See application file for complete search history.

(56) References Cited

U.S. PATENT DOCUMENTS

| | | | |
|---|---|---|---|
| 5,897,642 A | 4/1999 | Capossela | |
| 5,909,689 A * | 6/1999 | Van Ryzin | .................... 707/203 |
| 6,151,609 A | 11/2000 | Truong | |
| 6,243,706 B1 | 6/2001 | Moreau | |
| 6,243,857 B1 | 6/2001 | Logan | |
| 6,289,396 B1 * | 9/2001 | Keller et al. | .................. 719/323 |
| 6,369,836 B1 | 4/2002 | Larson | |
| 6,400,996 B1 | 6/2002 | Hoffberg | |
| 6,510,352 B1 | 1/2003 | Badavas | |
| 6,518,980 B1 * | 2/2003 | DeMotte et al. | .............. 715/762 |
| 6,560,513 B2 * | 5/2003 | Krause et al. | ................. 700/264 |
| 6,587,739 B1 * | 7/2003 | Abrams et al. | .................. 700/83 |
| 6,618,856 B2 | 9/2003 | Coburn | |
| 6,745,254 B2 | 6/2004 | Boggs | |
| 6,778,528 B1 | 8/2004 | Blair | |
| 6,788,980 B1 * | 9/2004 | Johnson | ........................... 700/1 |
| 6,853,867 B1 * | 2/2005 | Klindt et al. | ................... 700/83 |

FOREIGN PATENT DOCUMENTS

| | | |
|---|---|---|
| CN | 1288539 A | 3/2001 |
| WO | WO 00/17738 | 3/2000 |
| WO | WO 01/69335 | 9/2001 |

* cited by examiner

Primary Examiner — Kyung H Shin

(57) ABSTRACT

A method and system for generating programming code and/or configuration data for programmable controller and the networks on which they operate is disclosed. In one embodiment, programming code is generated on a centralized server having a web-enabled engineering tool. The engineering tool operates on client devices that are in communication with the server over a network, such as the Internet. Preferably, the engineering tool runs in a browser application (or other network-interfacing-application) on the client device and a user generates the programming code on the server with the aid of the client device. By centralizing the engineering tool, which may contain a configuration editor and a configuration management tool having version management functionality, a new business paradigm for providing engineering tool services to customers having programmable controllers. In addition, new methods and tools for collaborative engineering of programming code are enabled.

14 Claims, 27 Drawing Sheets

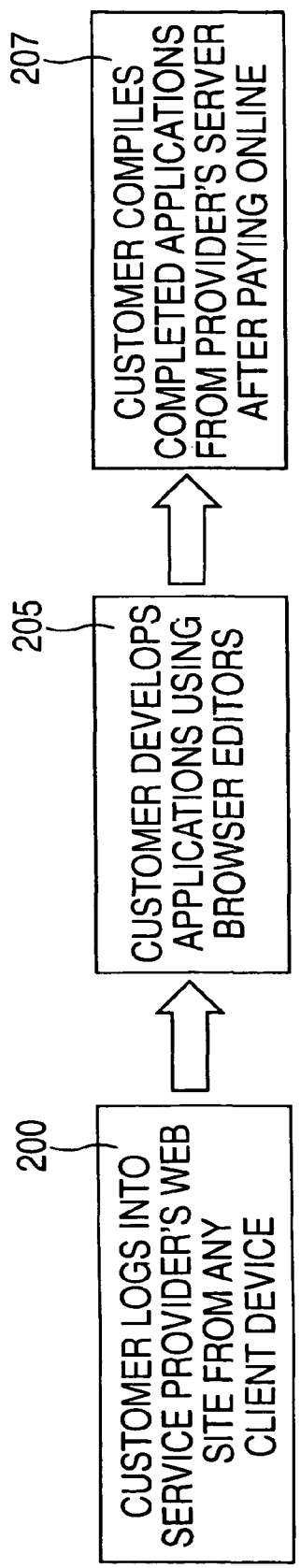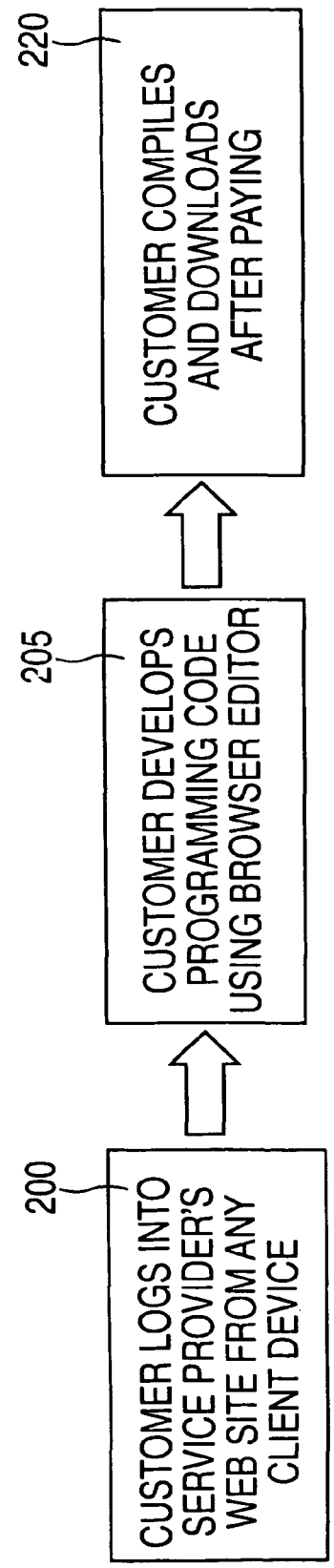
FIG. 18
FIG. 19

METHOD AND APPARATUS FOR PROGRAMMING PROGRAMMABLE CONTROLLERS AND PROVIDING VERSION MANAGEMENT FROM A CENTRALIZED SERVER

The present application is a divisional patent application of patent application Ser. No. 09/961,931 filed on Sep. 24, 2001, of Lo for "Method and Apparatus for Programming Programmable Controllers and Generating Configuration Data from a Centralized Server".

FIELD OF THE INVENTION

The present invention relates generally to the field of programmable controllers. In particular, the present invention provides an apparatus and methods for writing programming code and/or generating configuration data for these programmable controllers without the need to purchase and install an engineering tool on a programming device.

BACKGROUND OF THE INVENTION

Programmable controllers, including Programmable Logic Controllers ("PLCs") are used in many commercial and industrial applications. Programmable controllers typically monitor inputs, make decisions based on how they are programmed, and control outputs of automated processes or machines. One of the most common programmable controllers in use is the PLC. PLCs consist of input modules or points, a Central Processing Unit ("CPU"), and output modules or points. An input accepts a variety of digital or analog signals from various field devices, such as sensors, and converts them into a logic signal that can be used by the CPU. The CPU makes decisions and executes control instructions based on programming instructions stored in a memory. These programming instructions determine what the PLC will do for a specific input. Output modules convert the control instructions from the CPU into a digital or analog signal that can be used to control various field devices, such as actuators or valves.

Since most programmable controllers, including PLC's, are in essence computers, they store information in the form of On or Off conditions (i.e. 1 s or 0s), referred to as binary digits (i.e. bits). A program for a programmable controller consists of one or more instructions that accomplish a task. Programming a PLC or other controller is a matter of constructing a set of instructions. Programming usually also involves generating configuration data. Configuring a programmable controller involves mapping the controller's input/output)("I/O") area to the physical I/O. Configuration editors are generally graphical.

There are several ways to look at a program, such as for example, flow chart programming, Ladder Logic, Instruction Lists, or Function Block Diagrams. Ladder logic ("LAD") is one programming language used with PLCs. As is shown in FIG. 1, Ladder Logic code 10 uses graphical symbols that resemble electromechanical elements used in a relay logic diagram format to describe hard-wired control. The left vertical line of a typical Ladder Logic Diagram usually represents a power or energized conductor. A right vertical line, represents the return path of a hard-wired control line diagram, and may be omitted. Ladder Logic Diagrams are read from left to right, top to bottom. Rungs are often referred to as networks. A network may have several input and output instructions. Input instructions represented by a series of contacts, in one or more parallel branches, perform comparisons or tests, and are normally left justified on the rung. Output instructions represented by coils, for which there may only be one in each output branch, execute some operations or functions, and are normally right justified on the rung. As is shown in the exemplary Ladder Logic code 10 depicted in FIG. 1, I0.0, I0.1, and Q0.0 represent the first instruction combination. If inputs I0.0 and I0.1 are energized, output Q0.0 is energized. The inputs could be switches, pushbuttons, or contact closures. The output could, for example, be a solenoid or a light bulb. I0.4, I0.5 and Q0.1 represent a second instruction combination. If either input I0.4 or I0.5 are energized, output Q0.1 energizes.

An Instruction List ("IL") provides another view of a set of instructions and is exemplified at 20 in FIG. 1. The operation, i.e., what is to be done, is shown on the left. The operand, the item to be operated on by the operation, is shown on the right. The LAD and the IL have a similar structure. The set of instructions in the IL 20 of FIG. 1 performs the same task as the LAD of 10.

Function Block Diagrams ("FBDs") provide another view of a set of instructions and are exemplified at 30 in FIG. 1. Each function has a name to designate its specific task. Functions are indicated by a rectangle. Inputs are shown on the left-hand side of the rectangle and outputs are shown on the right-hand side. The Function Block Diagram 30 shown in FIG. 3 performs the same tasks as shown by the LAD 10 of FIG. 1 and the IL 20 of FIG. 1.

Programmable controllers in general, and PLCs in particular, execute program code in a repetitive process referred to as a scan. A scan may start with the CPU reading a status of inputs. The application program is executed using the status of inputs. Once the program is complete, the CPU performs internal diagnostics and communication tasks. The scan cycles ends by updating the outputs, then starts over. The cycle time depends on the size of the program, the number of I/O's, and the amount of communication required.

In order to write programming instructions and generate configuration data and download the code and configuration data to a programmable controller, several tools are needed. As is shown in FIG. 1, a programming device, such as a personal computer 1, is interfaced with a PLC 7. Typically, a proprietary cable 5, such as Siemens® PC/PPI, connects the computer's RS 232 port with the PLC 7. Prior to the present invention, engineering software tools 3, such as Siemens STEP 7,® had to be installed on the PC so that the PC might be used to write programming instructions for the PLC Typically, the engineering tools are sold on CD's or on another computer readable medium.

FIG. 2 outlines the typical steps and shortfalls that result from the purchase of a copy of an engineering tool. The customer of an engineering tool typically buys a copy of the software and obtains a license to use the tool, step 20. The customer must then install the software on a single customer computer, step 25. The customer can only develop application software, i.e. programming code for a programmable controller on computers that have the engineering tool, step 27. The license agreements typically accompanying engineering tools restrict the customer's ability to install the tool on more than one computer without paying for a license for any additional computers.

The software or engineering tools, such as Siemens STEP7® or MicroWin,® are often proprietary tools developed by the controller manufacturer. Typically, the development of these engineering tools takes thousands of person-hours. The tools are often designed and tested to work on a specific computer operating system, such as for example Microsoft Windows® 98. When the operating system for the computer on which the tool is used changes, the tool needs to be re-verified. Often, PC vendors deliver only the newest Microsoft operating system on their PCs. This forces the engineering tool vendors to also support the new operating system, which usually means additional hundreds or thousands more person-hours of investment. In many organizations, the operating system of the PC is updated without regard to the software, such as the engineering tools, residing on the PCs.

Engineering tools are often updated over time. Consequently, different version of the tools may exist at the same time. In a large manufacturing facility it is likely that not all the programming tools are using the same version. This not only increases the costs of ownership, but also can cause problems when different programming devices are used to write programming code for the same PLC application. Often, a team of engineers is assigned to program a PLC. Each engineer in the team may work independently on a discrete aspect of the application. At a later time, these various discrete aspects are combined into one program that operates on the PLC. If the engineers are not all using the same version of the tool, it is possible that the code generated from a version of the tool may not be compatible to an earlier version of that tool.

In addition to problems associated with running different operating systems on the programming devices and different versions of the engineering tools on the operating systems, the programming code for the programmable controllers is often not archived in a centralized manner. Often the code for one PLC in a factory may be stored on one laptop or desktop personal computer and the code for another PLC may be stored elsewhere. If a PLC were originally programmed with a first PC and that PC is latter replaced with a second PC and if the PLC reprogrammed with a second PC, there often would be no way to restore the original program, should the new program be deficient.

SUMMARY OF THE INVENTION

The present invention provides a system for programming a programmable controller, such as a PLC or other industrial controller. In one embodiment, a client device having a network-interfacing-application, such as for example a browser application, communicates over a network with a server. An engineering tool for creating programming code and configuration data for programmable controllers resides on the server. The engineering tool employs a programming language for programming programmable controllers and is accessible by the client device using the browser application residing thereon. The server may have an associated storage unit for storing programming code generated by the engineering tool on the client device. In some embodiments, the engineering tool employs a graphical programming language, such as Ladder Logic, Flowchart Programming, or Function Block Programming. In other embodiments, it may employ text based languages, such as Instruction Lists. A compiler for compiling the programming code may also reside on the server or be accessible to the server.

Accordingly, the present invention provides for numerous and robust methods for developing programming code for programmable controllers. In one embodiment, a user accesses a server over a network with a client device that has a browser application. The engineering tool is preferably invokable by the browser application. The user then creates a document containing programming instructions with the engineering tool. The document is then transmitted over the network to the server. The document may be stored on the server for later access and editing. In a particular embodiment, the document is an XML document.

In one embodiment of the present invention, programming code is stored on a central server. This provides a cost-effective and efficient method for programming programmable controllers. The server and the programmable controller may be interfaced to communicate with each other over a network. After interfacing the two, compiled programming code may be downloaded from the server to the controller over the network.

The present invention provides a new paradigm in the way entities approach programming of their programmable controllers. Entities wishing to program their programmable controllers need not purchase and maintain expensive engineering tools. Instead, an engineering tool may be web-enabled and may be maintained on a central server that is accessible over a computer network. Users having client devices are provided with access to the server over the network. The server receives from the client device a document containing programming code created on the client device with the engineering tool. The code may be compiled on the server and downloaded to the programmable controller. It may be downloaded directly to the controller, if the device is accessible over the computer network, or it may be downloaded to the device through a client device that resides on the network and that is interfaced with the programmable controller.

The present invention also enables the generation of configuration data for I/O networks and device on a centralized server. In general, development of programming code may comprise generating configuration data. In one embodiment of the present invention a configuration editor is maintained on a server. The server is communicatively coupled to a network and the configuration editor is adapted to be invoked by a client device over the network. The configuration editor may comprise a graphical editor, and it may be part of an engineering tool or be part of an engineering tool set.

The present invention also enables version management of various versions of a program for a programmable controller. A version management tool is installed on a server. Along with the tool, various versions of the program are stored. The version management tool is configured to be invokable by a client device over a network. The version management tool may have searching capabilities and functions for comparing one version with another to show changes between the two.

BRIEF DESCRIPTION OF THE DRAWINGS

FIG. 18 illustrates a new business paradigm for selling engineering tool services, according to the present invention.

FIG. 19 illustrates an alternative new business paradigm for selling engineering tool services, according to the present invention.

DETAILED DESCRIPTION OF THE INVENTION

Figure 3:
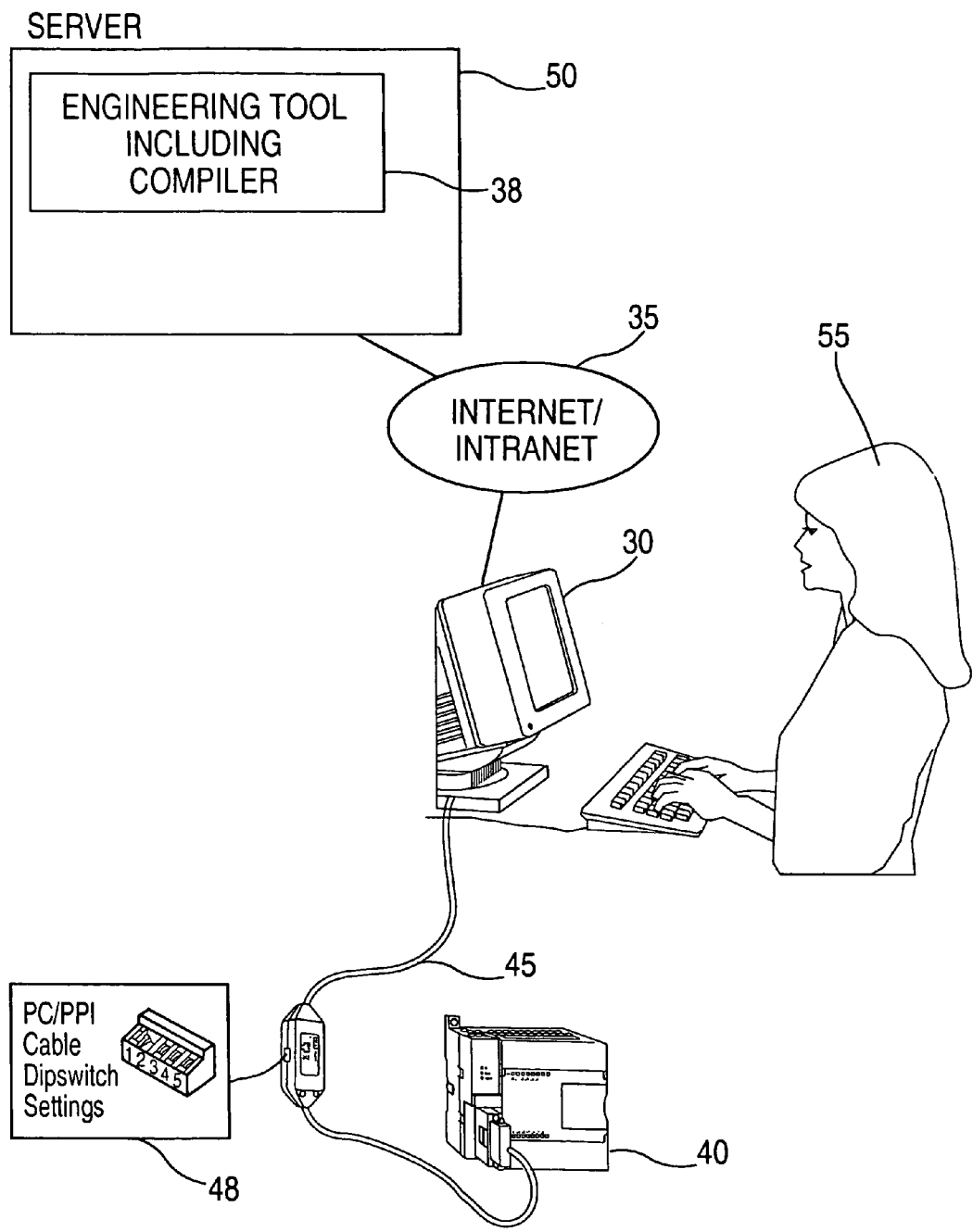
FIG. 3 is an illustration of one embodiment of the present invention, wherein a client device that is connected to a PLC is in communication over a network with a server containing a web-enabled engineering tool for writing programming code for the PLC and for configuring the I/O network and devices.

The present invention, among other things, provides systems and methods for writing programming code (which usually also involves generating configuration data) on a central server and for downloading compiled programming code along with any configuration data to a programmable controller, such as a PLC. As shown in FIG. 3, a client device 30, such as a personal computer containing a browser, such as Microsoft Internet Explorer® or Netscape Navigator,® resides on a public or private network 35. The network 35 may be the Internet or it may be an intranet. In one embodiment, a PLC 40, such as Siemens® S7-200 PLC, is connected to the client device 30 via an interface cable 45, such as Siemens® PC/PPI cable. The cable may contain dipswitches 48 to control settings, such as baud rate. In this embodiment, the client device 30 acts as a programming device 30 for programming the PLC 40. However, unlike prior art approaches to programming the PLC 40 wherein the engineering tools for programming the PLC are installed on the programming device, the engineering tools needed to write and compile programming code reside on a server 50 that is accessible by the client device 30 over the Internet or over an intranet or other network 35. The engineering tools are preferably web-enabled to operate in any browser application on any client device 30.

A user 55 accesses the server 50 over the network 35 with the client device 30. The client device 30 may be a thin client, i.e. it need not contain any software other than a browser. Thus, the client device 30 may take many forms including personal computers, web-enabled PDAs, cell phones, Internet ready television devices, and Internet appliances, etc. The present invention is scalable in that it may operate in a variety of modes on a variety of client devices having a variety of functionality. For instance, the present invention may operate with limited functionality on a web-enabled cellular phone browser, which has limited functionality and computing ability, or it may operate with robust functions on a sophisticated personal computer having a high-speed processor and large amounts of memory and robust graphic capabilities.

Figure 1:
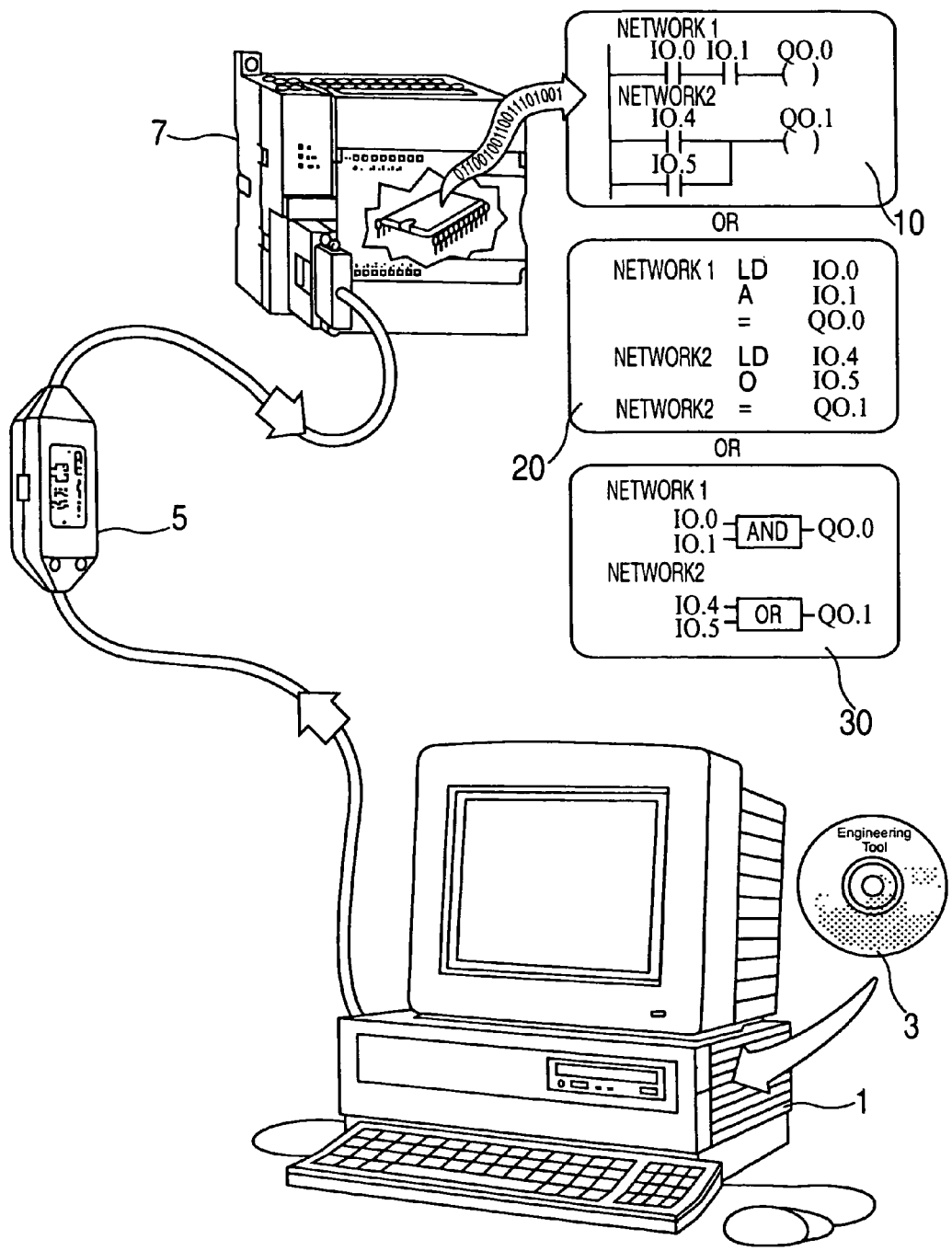
FIG. 1 is an illustration of the prior art tools required to program programmable controllers.

In accordance with the present invention, engineering tools, similar to tools such as Siemens STEP 7,® reside on the server 50 and are web-enabled. Typically, these engineering tools will employ graphical programming schemes, such as Ladder Logic, Flowchart Programming, Sequential Function Charts, or Function Block Diagrams. (See e.g. FIG. 1). Preferably, they are configured to handle a variety of programming languages, including Instruction List Programming and all other standard languages, such as for example all IEC-1131 standard languages (e.g., LAD, FBD, SFC, IL and ST). The tools are configured to run in a browser application, thus making them operate independently of the operating system employed by the client. Preferably, the engineering tools are configured to operated with an HTML or XML interface, so that they can operate on any available browser. The tools also may provide a configuration editor to map a controller's logic I/O area to a physical I/O area.

Figure 4:
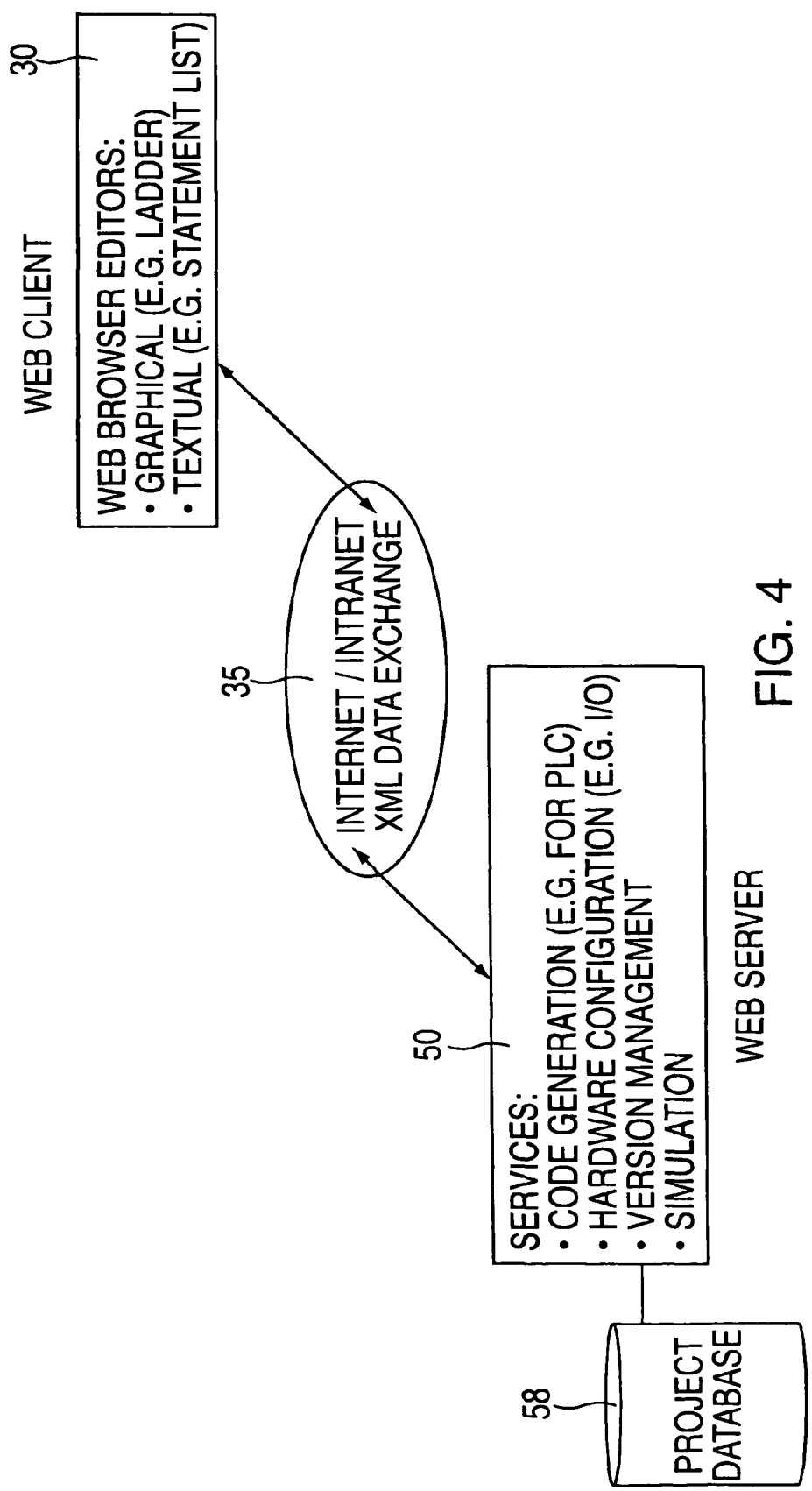
FIG. 4 is an illustration of the general architecture of one embodiment of the present invention, wherein an engineering tool for writing programming code for a programmable controller and for configuring the I/O network and devices resides on a server that is accessible over a network by a client device.

FIG. 4 depicts one embodiment of the general system architecture for web-enabled engineering tools. A web-client device 30 contains a standard web-browser. An engineering tool for generating programming code for a programmable controller resides on a web-server 50 and is capable of operating on the web-client in a browser application. The engineering tool is web-enabled, and, in its most basic form, it comprises an editor or editors that may be run on the web-browser. Advantageously, the editors are operating system independent and may run on the latest browser, operating system, and hardware. The web-server 50 may also contain an editor for performing hardware configuration. It may also contain software and hardware necessary to perform version management and to run simulations. The web-client 30 and the web-server 50 both reside on a network 35, such as an intranet or the Internet. A user creates programming code and/or generates configuration data for a programmable controller on the web-client 30. The code and configuration data are converted to an XML document and transmitted over the network 35 to the web-server 50. Programming code and configuration data may be stored in a project data base 58 associated with the web-server 50. The project data base 58 may take the form of any standard storage medium. The server 50 need not be running the latest platform (OS and hardware).

Figure 5:
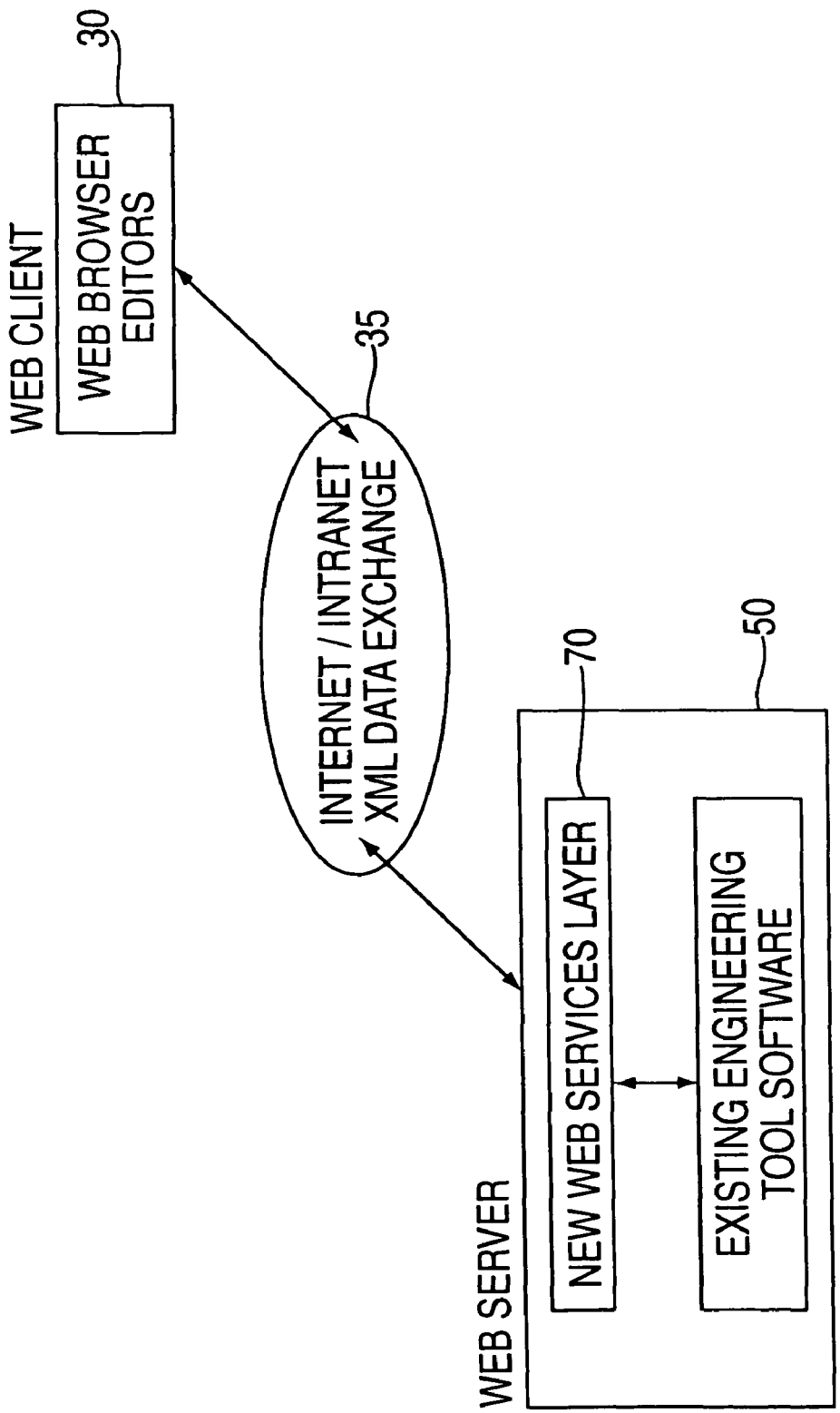
FIG. 5 illustrates an alternative embodiment of the present invention, wherein the server also contains a web service layer.

FIG. 5 depicts an alternative embodiment wherein a web service layer 70 is incorporated with the server 50. Additional web-services, such as simulation services and tools, may be layered on top of existing engineering tools. This provides the engineering tool developer with a quick and cost effective way to innovate and develop new products. An engineering tool vendor can leverage and extend the longevity of their existing investment in developing the engineering tool. In this embodiment, users of a basic engineering tool will have at their disposal robust engineering services that are only a mouse click away.

XML is particularly well-suited for use with the present invention because graphical representations, such as those used by common PLC programming languages, are readily converted to an XLM document. Thus, the transmission between the client 30 and the server 50 is preferable in the form of an XML document.

Figure 6:
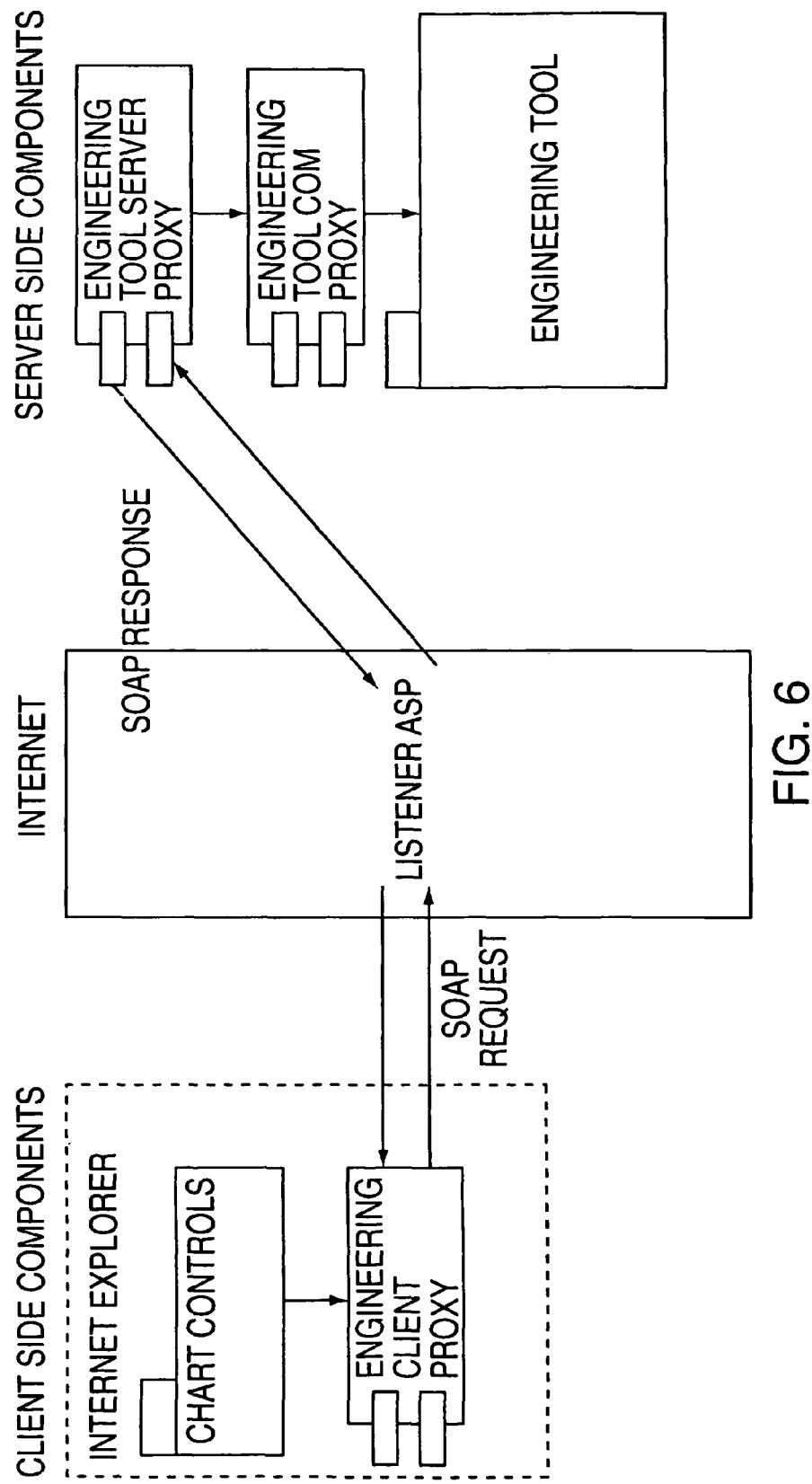
FIG. 6 illustrates, from both a client and server perspective, the components of a web-enabled engineering tool according to the present invention that operates over the Internet, wherein chart-programming techniques are used.
Figure 7:
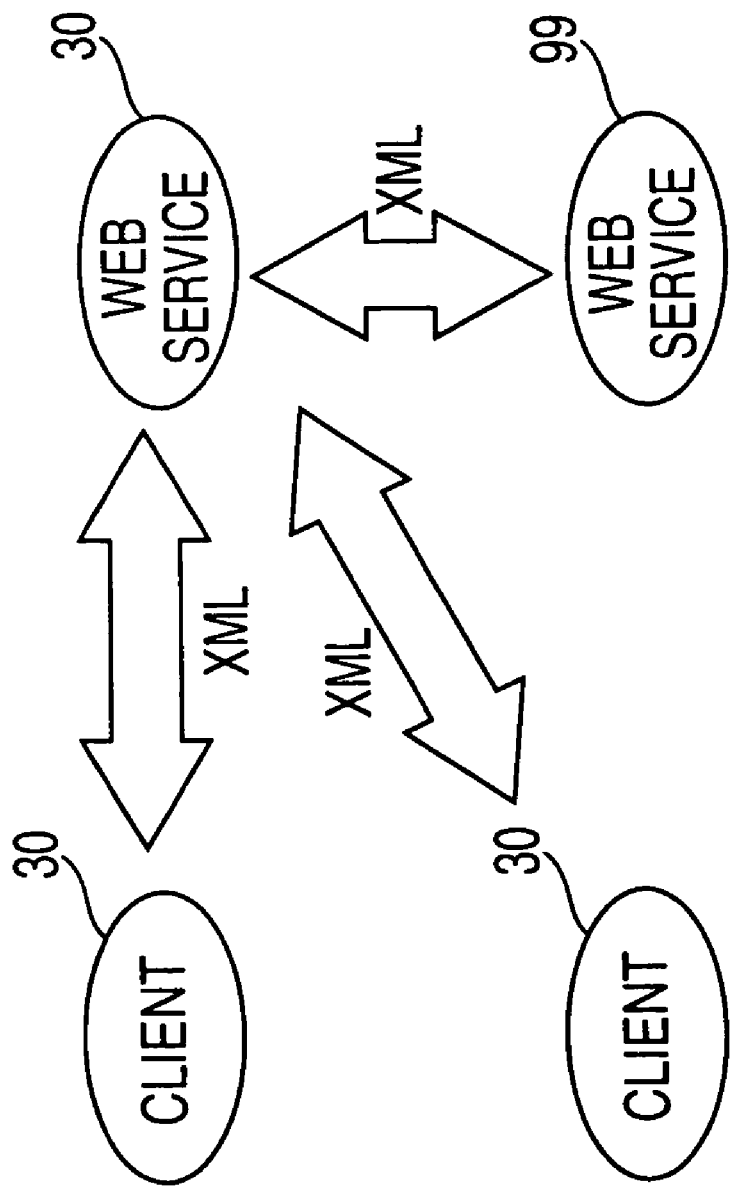
FIG. 7 illustrates an alternative method for web-enabling an engineering tool using XML formatting according to the present invention.

FIG. 6 illustrates the client-side, server-side and Internet components needed to web-enable a standard engineering tool, such as Siemens STEP 7® using Chart Programming Techniques. While Chart Programming Techniques may be used to web-enable standard engineering tools such as Siemens STEP 7,® Microsoft's® .Net technology provides a more efficient method for web-enabling engineering tools. As is shown in FIG. 7, .Net technology facilitates interfacing a web service application 99 and a web-server using XML formatting. It also allows for client-server data exchange in an XML format.

Figure 8:
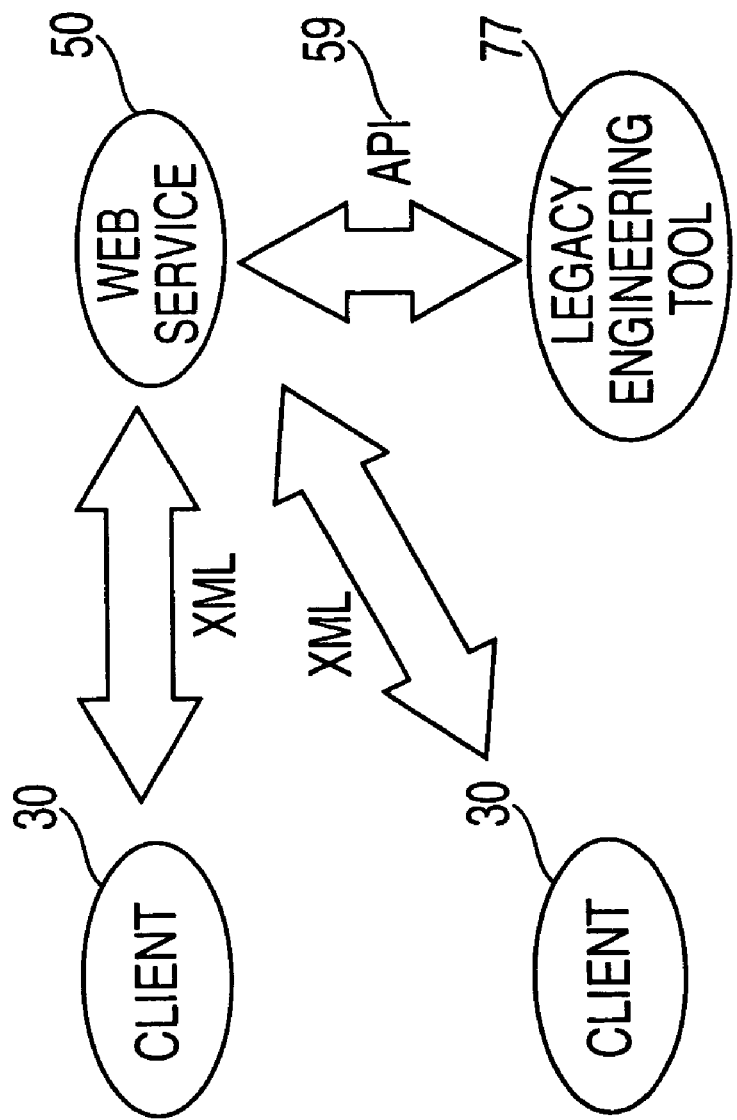
FIG. 8 illustrate web-enabling a legacy engineering tool according to the present invention using the application interface of the legacy tool.

As is shown in FIG. 8, new web services 50 can be build on top of the Application Interface ("API") 59 of an existing engineering tool 77, such as Siemens STEP 7®. The server 50 and client devices 30 then exchange XML documents using standard protocols.

Figure 9:
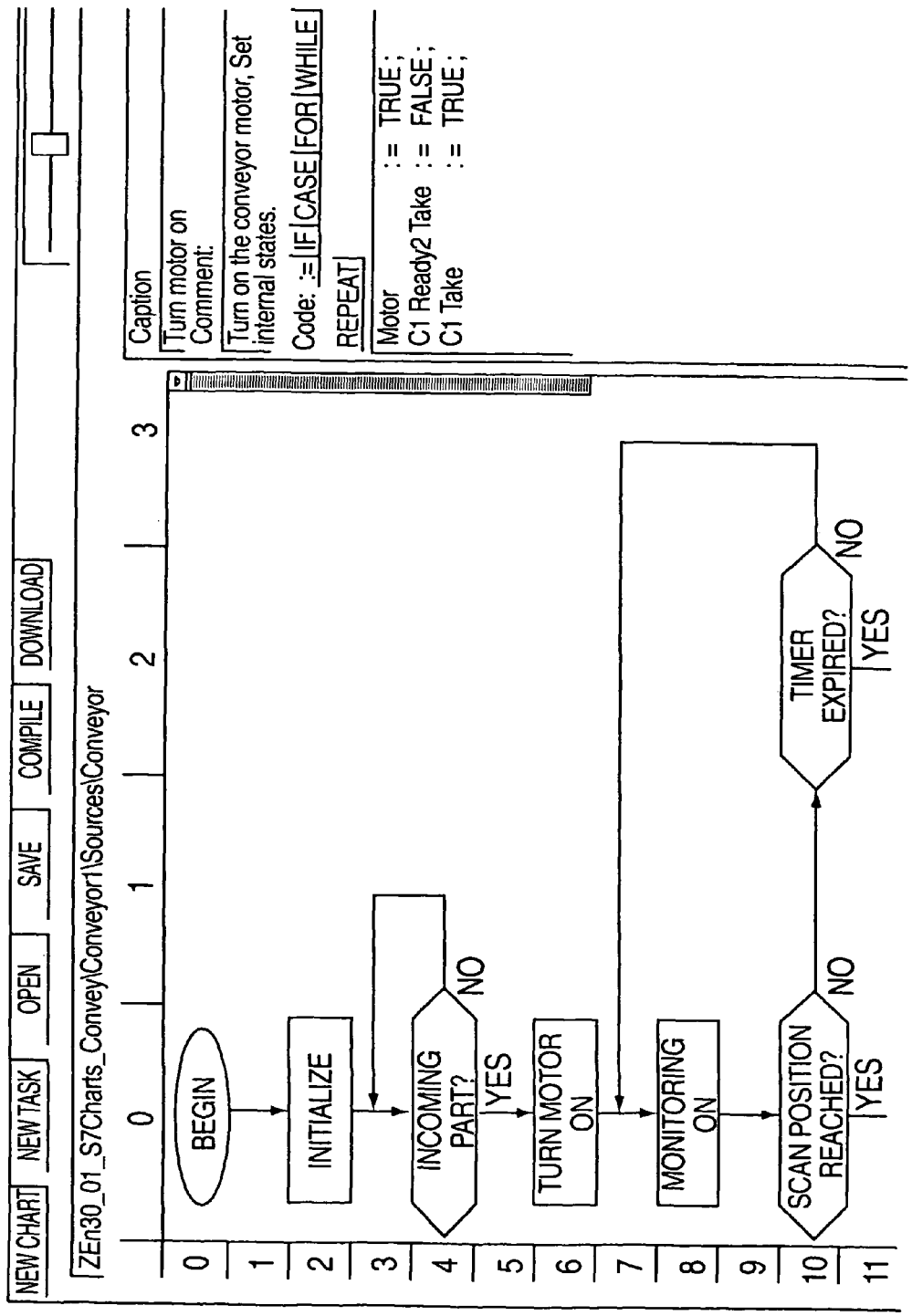
FIG. 9 is a screen view of a web-enabled Flowchart Programming engineering tool according to the present invention.
Figure 10:
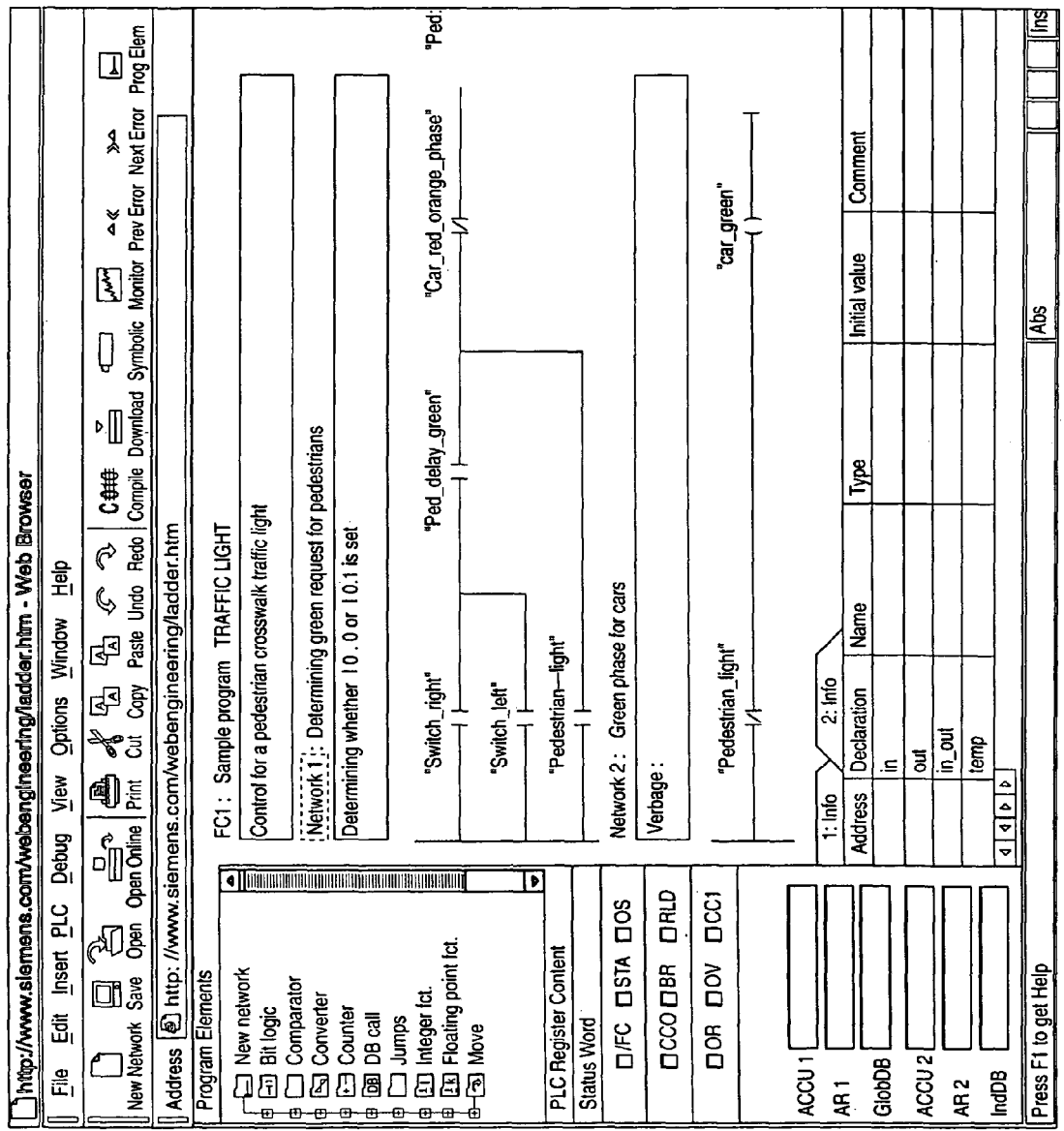
FIG. 10 is a screen view of a web-enabled Ladder Logic programming engineering tool according to the present invention.

The web-enabled, browser-executable engineering tools preferably have user friendly functions for the various phases of an automation project. Screen views depicting a typical web-enabled engineering tool as it would be viewed on a client device with a standard browser are depicted in FIGS. 9 and 10. FIG. 9 depicts a web-enabled flowchart programming engineering tool and FIG. 10 depicts a web-enabled engineering tool for programming in a Ladder Logic scheme. Typically, these engineering tools include functions, such as configuration and parameterization of hardware; definition of communication; programming; testing, start-up and servicing; documentation and archiving; and operating/diagnostics. The tools may also contain a symbols editor for defining symbolic designations, data types, and comments of global tag. The tools preferably support all programming languages, including but not limited to flowchart programming, IL, ST, SFC, LAD, and/or FBD, and all subsequent programming languages specified by IEC.

As discussed above, the functions provided by the engineering tools may be scalable depending upon the type of client device they will run on. For example, a very thin client device, such as a web-enabled cellular phone, may only be able to run a tool that uses text based or limited graphical editing functions. A more sophisticated client device, such as an IBM 600E Thinkpad,® can support more functions and can in turn allow the engineering tool to perform more functions, such as full graphical editing during code development. Thus, in accordance with the present invention, whether the engineering tool functions are perform on the client device or on the server side, may vary depending upon the capabilities of the client device, the speed of the Internet or intranet connection, and other parameters.

Figure 11:
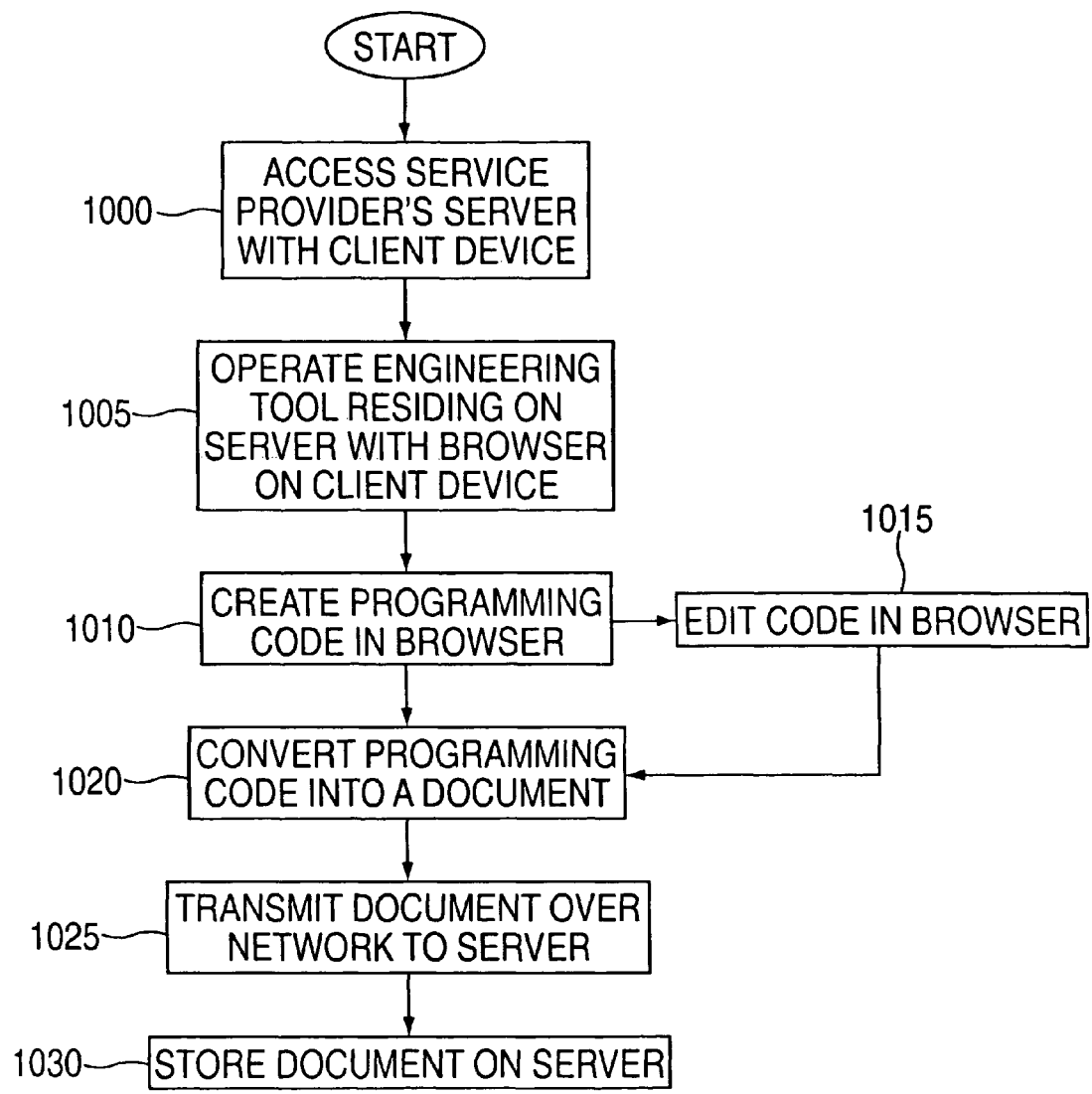
FIG. 11 is a flowchart outlining method steps of one embodiment of the present invention.

As is shown in FIG. 3 and outlined in this flowchart of FIG. 11, in one embodiment of the present invention, a user (or several users) may access a PLC programming engineering tool 38 (or an engineering tool for programming other programmable controllers) that resides on a server 50, step 1000. In one embodiment, the server 50 resides on the World Wide Web portion of the Internet. In another embodiment, the server resides on a private corporate network or a corporate intranet. The user 55 operates the engineering tool 38 on a web browser on the client device 30, step 1005, and creates programming code on the browser for the programmable controller, step 1010. Standard security measures may be employed to limit access to both the server and to the programs created thereon. The user 55 may create a program in a single session or over a period of several sessions. The user may modify, edit, and debug the programming code in a browser application, step 1015. The code generated on the browser may be in graphical form. The code is then converted to a document, step 1020 and the document is transmitted over the network to the server, step 1025. Preferably, the programming code is stored on the server 50, step 1030.

Editing software, debugging software and a compiler may be located on the server 50. This allows virtually any PC, PDA, or other web-enabled client device 30 to act as a programming device. After the user 55 creates and edits the programming code, the code may be stored and compiled on the server 50, which preferably has a compiler. In some embodiments, an additional server could be used to archive the code. Moreover, the compiler may also reside on a different server that is accessible to the server containing the engineering tool.

Figure 12:
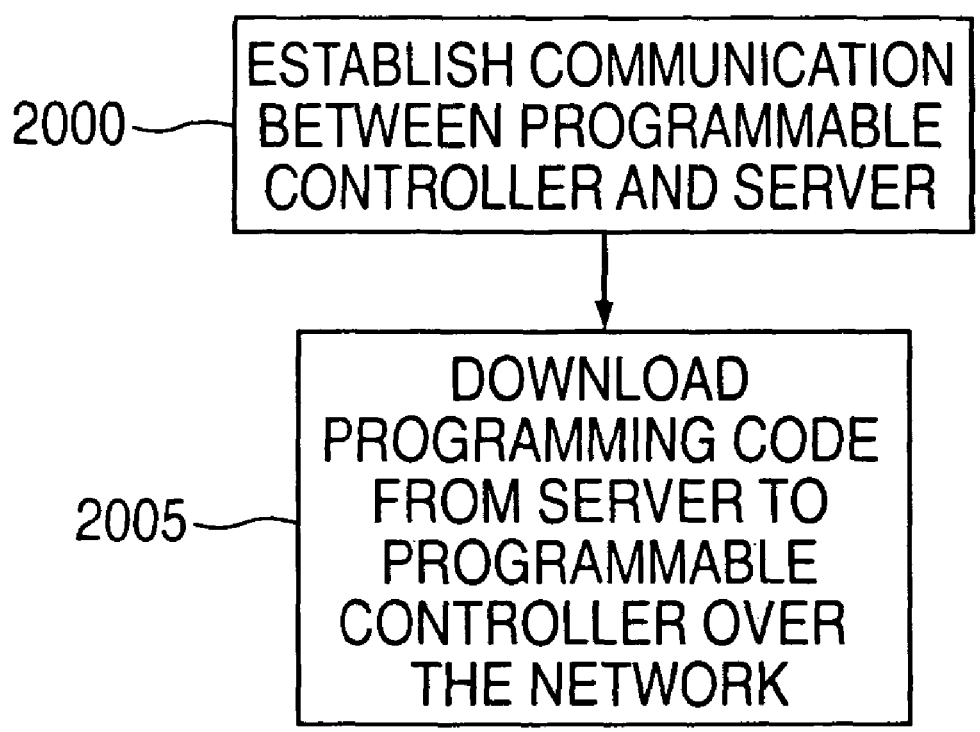
FIG. 12 is a flowchart outlining a method according to the present invention for programming a programmable controller.

After the code is created, debugged, and compiled, it is downloaded to a programmable controller. As is shown in the flowchart of FIG. 12, in one embodiment programming a programmable controller comprises two steps: establishing communication between the controller and the server, step 2000, and downloading the programming code to the controller over the network, step 2005. In one embodiment, such as the one shown in FIG. 3, the code may be downloaded to the client device 30 which in turn may then be interfaced with the programmable controller 40. In this embodiment, a copy of the compiled programming code may reside on the client device or be archived on the client device.

Figure 13:
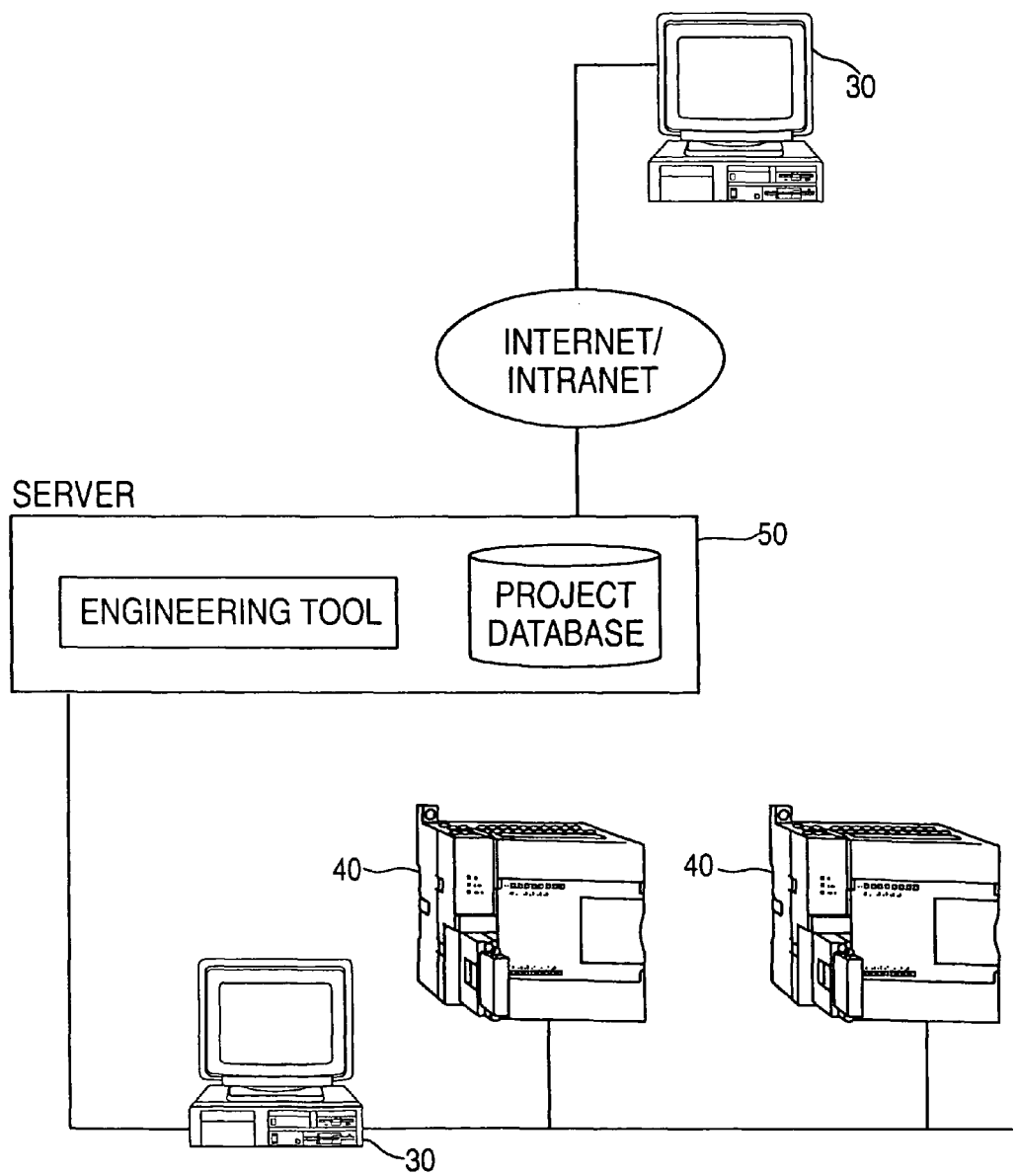
FIG. 13 illustrates a configuration of a system according to present invention, wherein a client device is networked with a server, having a web-enabled engineering tool, and a second client device networked with the server is on a LAN with one or more programmable controllers.

Typically the client device 30 is interfaced with the programmable controller 40 via a connector cable 45, such as Siemens PC/PPI Connector Cable (see FIG. 3). As is shown in FIG. 3, when a PC is used as the client device 30 the connector cable allows a serial interface on the programmable controller to communicate with a standard RS-232 serial interface. When another device, such as a PDA, is used as the client device, the connector cable interfaces with a communication port on the device. The cable may, as is shown in FIG. 3, contain DIP switches 48 that are used to select an appropriate speed (baud rate) at which information is passed between the PLC 40 and the client device 30. The client device 30 may, as is shown in FIG. 13, be interfaced with a plurality of programmable controllers 40. In some embodiments, where there are a large number of programmable controllers interfaced with a single client device a repeater (not shown) may be needed in conjunction with the cable.

Figure 14:
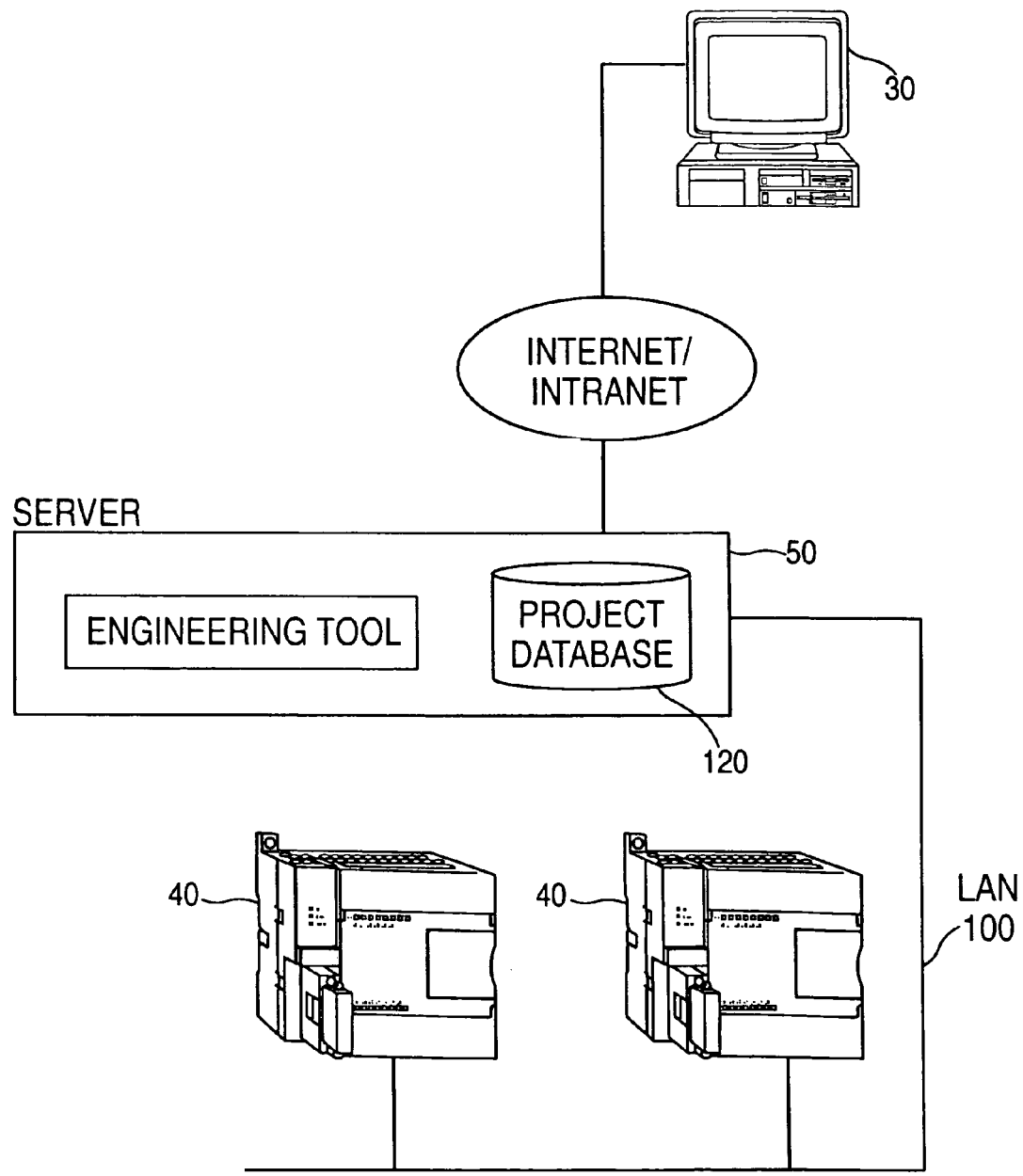
FIG. 14 illustrates an alternative configuration of the present invention, wherein the programmable controllers are directly interfaced with a server, having a web-enabled engineering tool, that is in communication with a client device.

In an alternative embodiment, such as the one shown in FIG. 14, the programmable controllers 40 may be directly or indirectly connected to a network, such as a LAN 100, on which the server resides without having to go through the client device 30. In this embodiment, the programmable controllers 40 are in communication with the server 50 over the networks, 100 which may comprise a standard network using TCP/IP-ethernet protocols, a Profibus® network, or virtually any other network configuration. The compiled programming code may be then downloaded directly to a programmable controller 40.

Figure 15:
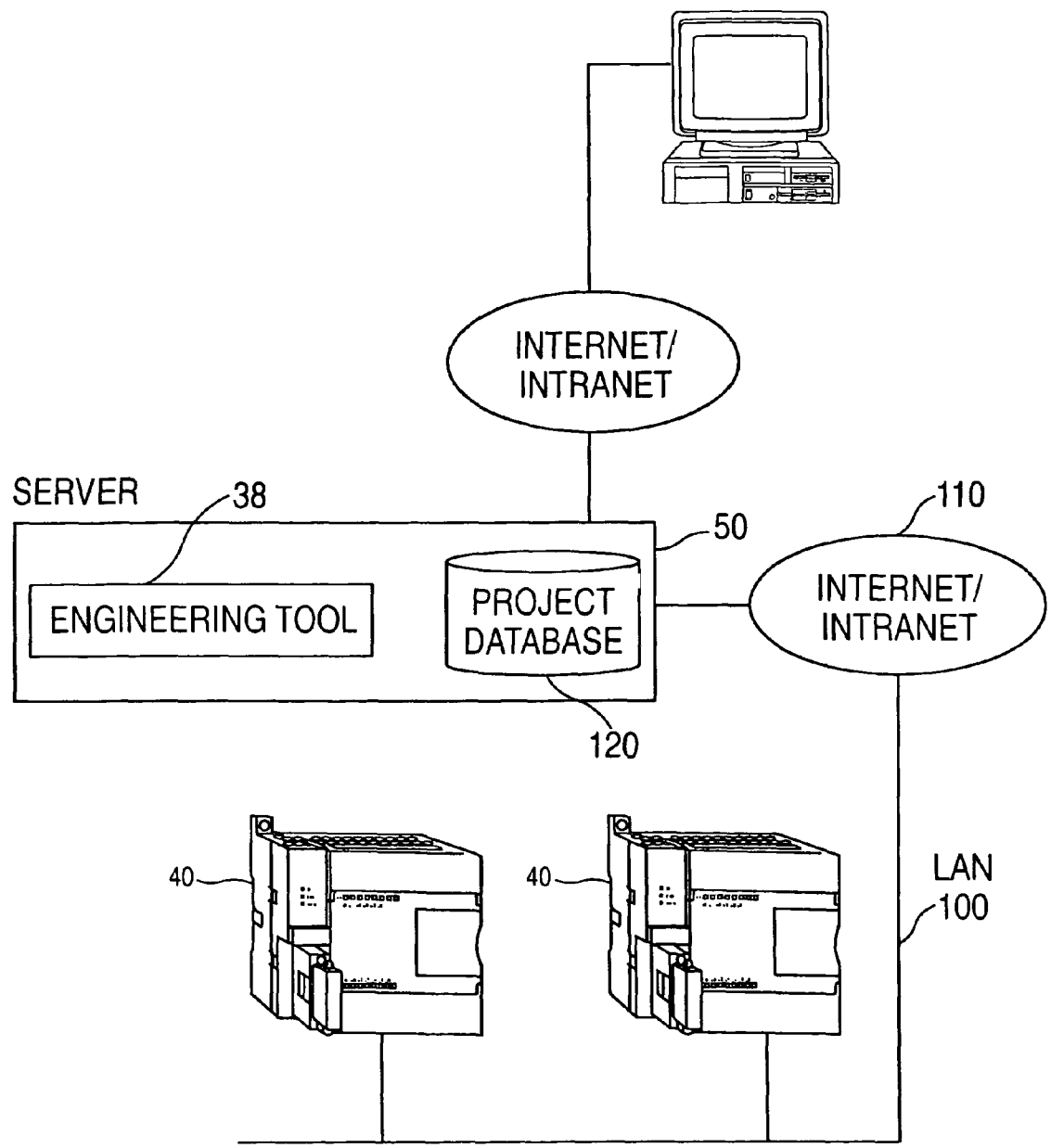
FIG. 15 illustrates yet another alternative configuration of the present invention, wherein a server having a web-enabled engineering tool is on the Internet or an intranet with a client device and one or more programmable controllers are networked with the server over an intranet or the Internet.

In yet another embodiment, such as the one depicted in FIG. 15, the programmable controllers 40 may communicate with the server 50 over a network, 110 such as an intranet or the Internet. The programmable devices may, in some embodiments be linked together on a LAN 100 using protocols such as TCP/IP or Profibus® or any other appropriate protocol.

Regardless of whether the programmable device is directly interfaced with the network where the server resides or is in communication with the server through a client device, an archival copy of the programming code may be stored in an archival project database 120 on the server 50 or on a memory device associated with the server 50. (See FIG. 14). This advantageously provides centralized storage for back-up copies of the compiled programming code. The archival copy may also be stored on a separate server or in a database available over the network.

Figure 17:
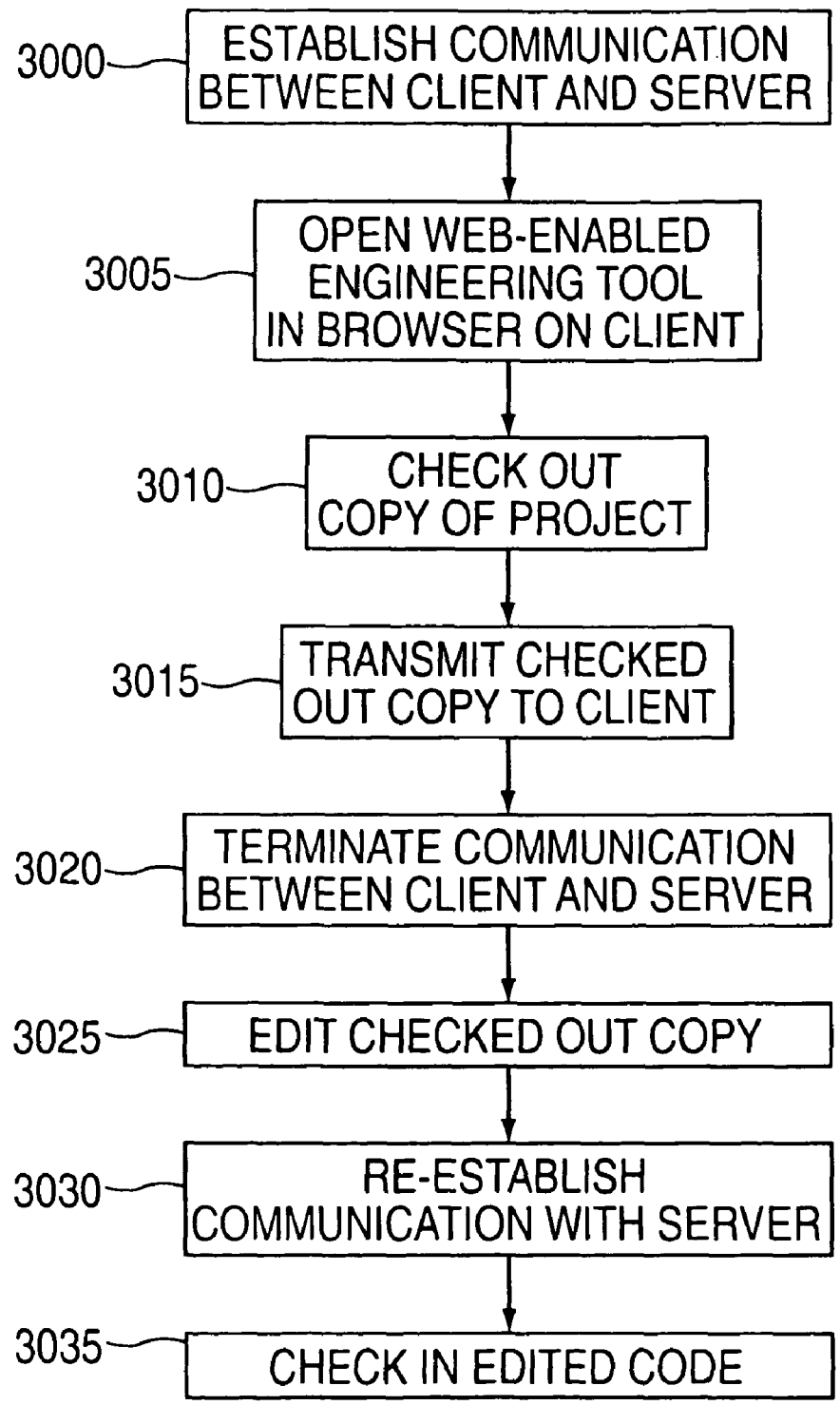
FIG. 17 is a flowchart outlining the steps for generating programming code off-line, according to the present invention.

In some embodiments it may be desirable to create the programming code for the programmable controller off-line, i.e. after the client device is disconnected from the server containing the engineering tool. Off-line programming allows a user to create and edit the program code without maintaining a connection with the server. As is outlined in the flowchart of FIG. 17, a user establishes communication between a client device and a server containing a web-enabled engineering tool and a database of programming projects, step 3000. The user then opens the web-enabled engineering tool in a browser application on the client 3005. The user then checks out a copy of the project from the project data base, step 3010 and the copy of the project is transmitted to the client device, 3015. Communication between the client and server is then terminated, step 3020. The user is now free to edit the checked-out copy off-line, step 3025. When the user is finished editing, the user reestablishes communication between the client and server, step 3030. The edited programming code is then checked back in 3035, and may be accessed by other users who have access rights. In some embodiments, while the project is checked out, other users may be permitted to read a copy of the checked out project in the form it existed prior to being checked out. Depending upon the sophistication and resources of the client device, off-line programming techniques and functions may vary.

Where the client device lacks sophistication, a simple text based edit-only function may be provided. Where the client resource contains higher levels of sophistication (e.g., memory, graphics capability, processor speed, etc.) more sophisticated graphical editing/code creation functions may be provided. Thus, the present invention is scalable. For example, in one embodiment operating on a simple web-enabled device the user may be provided with only a text editing function, while in an other embodiment operating on a more sophisticated client, the user may be provided with an engineering tool that operates in the web-browser that contains all the graphical editing functions that exist when the user is connected to the server.

In addition to depending on client resources (e.g., memory), other factors, such as the client operating system and security issues, may impact the functionality of the web-enabled engineering tool. In order to work off-line, the operating system of the device needs to support some way of installing the application on the client device. This is generally not an issue with modern PDAs, but may be an issue with smaller appliances, such as cellular phones. For security reasons, web browser applications are generally restricted from accessing system resources, such as drives and system memory. Microsoft Corp., Redmond Wash., provides software for allowing applications running on its Internet Explorer® to access client side system resources by means of ACTIVEX controls embedded in the application. For those wanting better security, Microsoft Corp. provides the user with the ability in its browser to disable downloading of ACTIVEX controls altogether, or only accept downloads from trusted sites or only originally signed ACTIVEX controls.

In one embodiment, specific functions are provided to the client device on an as-needed basis. For example, syntax checking is not provided until the user of the client device needs that function. This enables the user to download to the client device minimal functions initially and to add additional functions only when those functions are needed.

In general, the programmable device does not need to be connected to the programmable controller when programming code is being generated and compiled. However, in some embodiments it may be desirable to have the programmable controller on-line with the server and the client device at the same time. In this embodiment, changes are downloaded to the programmable controller. In addition, status of input and output elements can be monitored. In some embodiments the server may be equipped with diagnostic software or functions that allow for monitoring of the programmable controller. In yet other embodiments, the server can simulate inputs and outputs and communicate these with the programmable controller. This allows for diverse and robust testing algorithms to be created and stored centrally. In some embodiments, the robust test algorithms may be accessible only by authorized users and the users may be charged a fee for their use.

Figure 2:
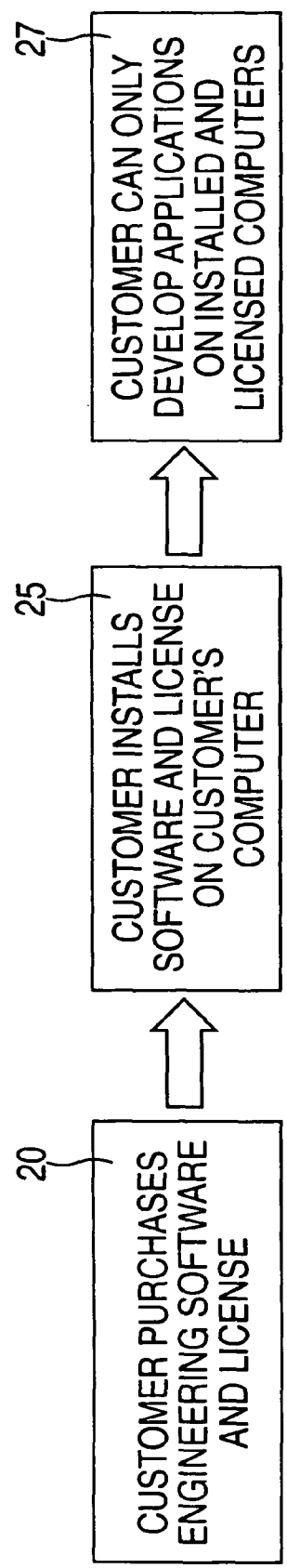
FIG. 2 is a block diagram illustrating the steps and shortcomings of the prior art methods and tools for programming programmable controllers.

The present invention provides a new paradigm in the engineering tool industry. Prior to the present invention, engineering tools were products that were manufactured and sold (See FIG. 2). In accordance with the present invention, web-enabled engineering tools provide a new business paradigm where the manufacturer of an engineering tool provides a service. (See FIGS. 18 & 19). In one embodiment, such as the one outlined by the flowchart of FIG. 18, a user is provided access to the server containing an engineering tool for developing and compiling programming code for a programmable controller, step 200. The user may be provided free access to the engineering tool for the purpose of writing programming code. The user can develop the code on a client device that communicates with the server, step 205. The user can create and modify programming code without being charged a fee. This advantageously provides even small business concerns with access to sophisticated and up-to-date engineering tools.

Only after the user completes the code and compiles it is a charge incurred, step 207. In some embodiments, the charge is calculated at the time the programming code is compiled. In another embodiment, the user is charged upon downloading the compiled code to a PLC. (See FIG. 19, step 220). The charge for the code may be based on the size of the compiled code, the time required to write the code, the number of inputs and/or outputs the code is designed to handle, or a variety of other parameters that may be measured. Since the engineering tool resides on a central server and not on a client device, limiting and controlling access to the tool is simplified. Moreover, it is a simple matter for a customer service representative or salesperson to provide a customer with additional use of the programming tool where such additional use would be advantageous from a business prospective. For example, a salesperson might provide a limited period of free use of a web-enabled engineering tool for programming and configuring a PLC when a customer purchases a new PLC or new field device that interfaces with an existing PLC.

Figure 16:
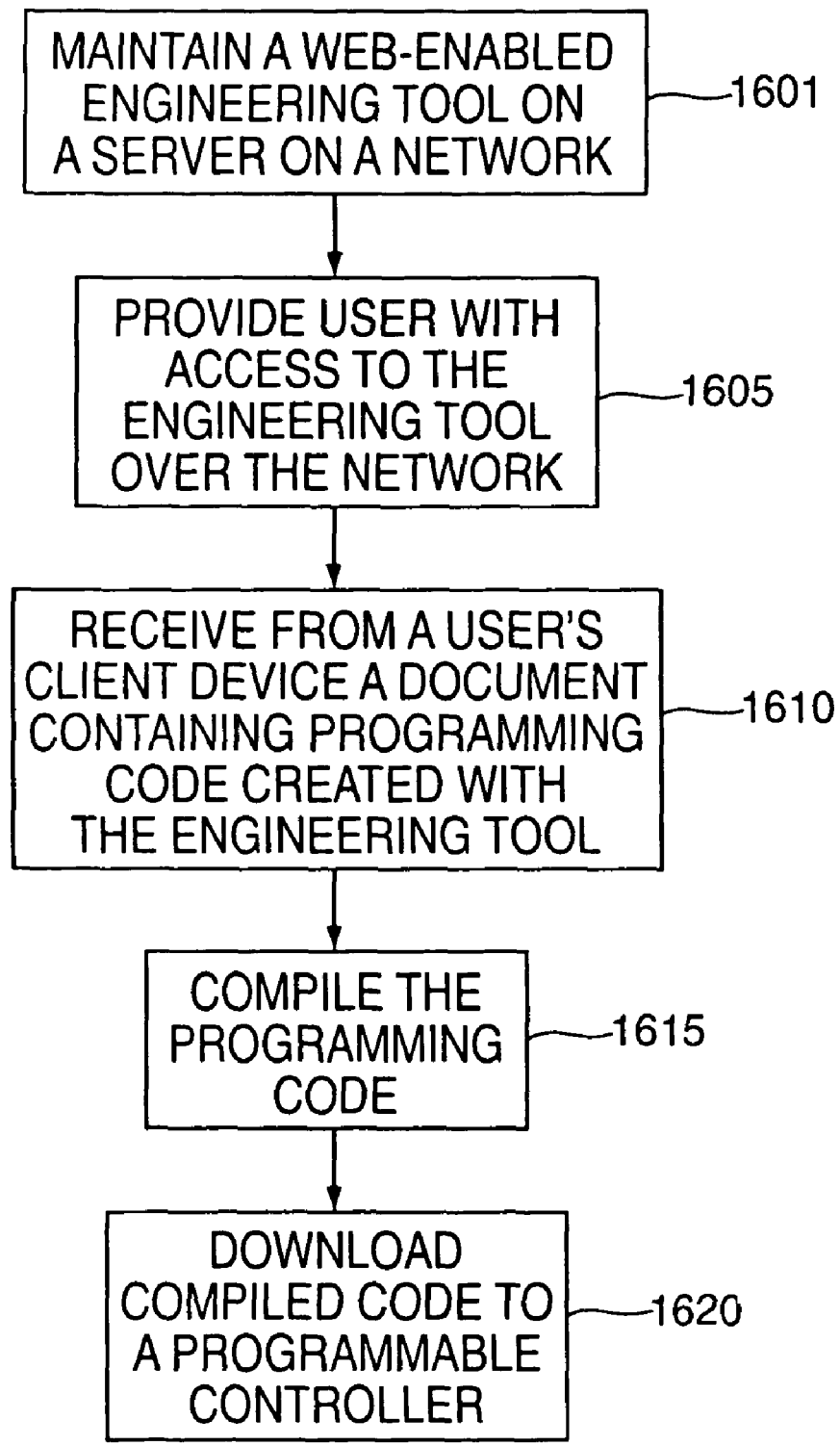
FIG. 16 is a flowchart outlining the steps for providing engineering tool services according to the present invention.

Viewed from the perspective of the entity building and/or supplying engineering tools, the new business paradigm may take the form of the steps outlined in the flowchart of FIG. 16. The tool manufacturer or provider maintains a web-enabled engineering tool on a server that is accessible to clients over a network, such as the Internet, step 1601. Clients are provided access to the tool over the network, step 1605. In some embodiments, passwords or other security measures may be used to restrict access to only authorized users; while in other embodiments the public may have access to the tool, but not necessarily access to the code created with the tool. In accordance with this embodiment, the engineering tool provider receives a document, e.g., over a network, from a user that contains programming code that was generated with the web-enabled engineering tool, step 1610. The programming code may then be compiled, step 1615, or it might be saved and made accessible to the entity that created it or to an entity authorized to access it. Eventually, the code is compiled and then downloaded to a programmable controller, step 1620.

Figure 20:
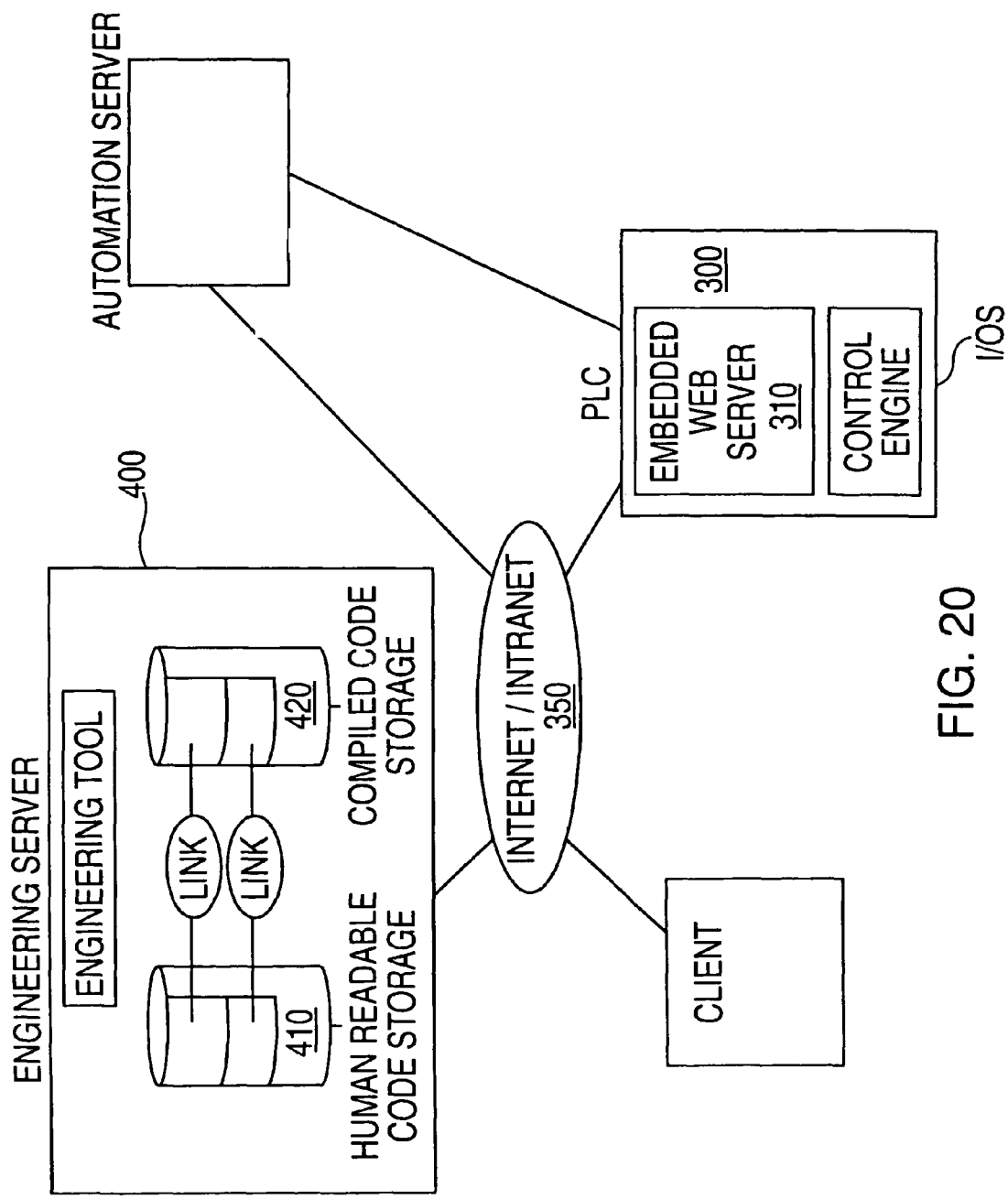
FIG. 20 illustrates an embodiment of the present invention wherein human-readable engineering code is stored on a server and linked to the compiled code running on a programmable controller and accessible to an automation server.

Since the code is created on a central server, the code may be archived in both human-readable form and in compiled form (see FIG. 20). This provides a method to reinstall existing software on new programmable controllers or to restore old versions of code when a new version fails to perform in a desired manner. In one embodiment, the user is charged a fee for obtaining downloading an archived copy. This fee may be lower than the initial fee for the first copy downloaded to the user.

Moreover, since in some embodiments, the human-readable form of the code (also known as source) is archived and linked with the machine readable code, web-enabled monitoring, simulation, and control of automated facilities is facilitated. For example, as is shown in FIG. 20 a web-enabled PLC 300 may contain an embedded webserver 310. The PLC may be connected to a network 350, such as the Internet or an intranet. The PLC may be programmed with the web-enabled engineering tools of the present invention. The programming code for the PLC may reside on an engineering server 400 in both human-readable form and in compiled form. The human-readable form is stored in a memory or data storage device 410 and the code is linked to the compiled form that also resides in a memory device 420 associated with the engineering server. Since the engineering server is accessible over the Internet or an intranet along with the PLC, it is possible to maintain another server (either a server physically separate from the engineering server or a virtual server, which is physically part of the engineering server or the PLC), such as an automation server on the same network. The automation server may even be part of the PLC, such as when the PLC contains an embedded web-server. Sophisticated and robust simulation, monitoring and control software may reside on the automation server and be web-enabled to be accessed by a client device on the Internet or intranet. Since the human-readable version of the programming code for the software running on the PLC is available via the engineering server, robust simulation, diagnostic, control, and monitoring software packages may advantageously access the human-readable code and provide valuable information for running these software packages. For example, since the human-readable code is readily accessible, accessing tag information for various field devices controlled by the PLC is facilitated. The present invention thus enables sophisticated and robust communication and data transfer from a shop floor to a board room.

As is shown FIG. 5, maintaining a server with centralized web-enabled engineering tools provides a platform for the developer of the engineering tool to launch new services and products. For example, prior to the present invention, the cost of purchasing simulation tools for optimizing programming code prohibited many customers from investing in these tools. Since, in one embodiment, the programming code is stored and generated on a central server that is accessible by a large numbers of customers, the cost of installing simulation software on the server can be spread over this large number of customers. Moreover, in one embodiment, customers only pay for the use of the simulation tools. In addition, diagnostic tools could be installed on the server and shared in a like manner. In some embodiments, the owner of the server and tools could be compensated based on usage, based on savings to the customers, or a variety of other schemes.

Because the tools are centrally located, licensing of the tools is simplified. The tools may be licensed to companies, certain individuals within a company, or individuals themselves. Access to the tools may be accomplished using encryption techniques and/or password protection and can be conditioned upon maintaining a valid license. In some embodiments, it may be desirable to provide a limited period of free access to the tool. In some cases, the amount of free access can be tied to the purchase of programmable controllers. Providing an on-site server free of charge for a limited period may also be useful in selling long term leases of servers to customers. In this embodiment, the user is provided with the server for a limited free trial period.

Figure 21:
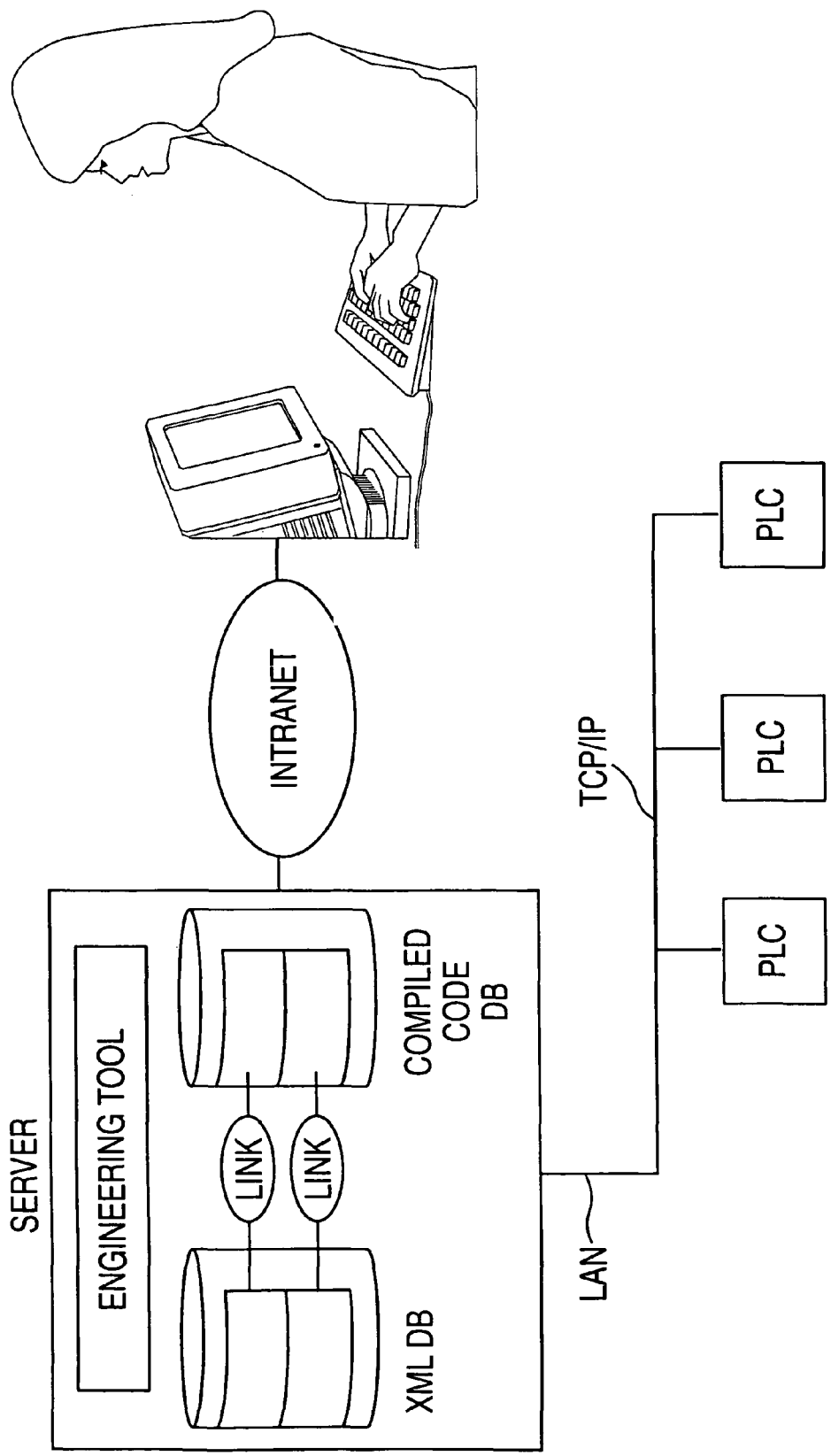
FIG. 21 illustrates how the present invention may be set-up to be in a single corporate or business entity.

In an alternative embodiment, such as the one shown in FIG. 21, a company may choose to lease or own its own server. For some large manufacturing companies and/or other entities where security is a major concern, limiting access to the server to only the companies' employees may be advantageous. Because the engineering tool resides on the server and not each user's PC, version management, updating and other software maintenance tasks are simplified. Moreover, the engineering tool is operating independently of the operating system on the user's programming devices. Because the server is accessible to only the companies employees, proprietary information may be stored on the server and accessed by a programming team working at different locations.

Figure 22:
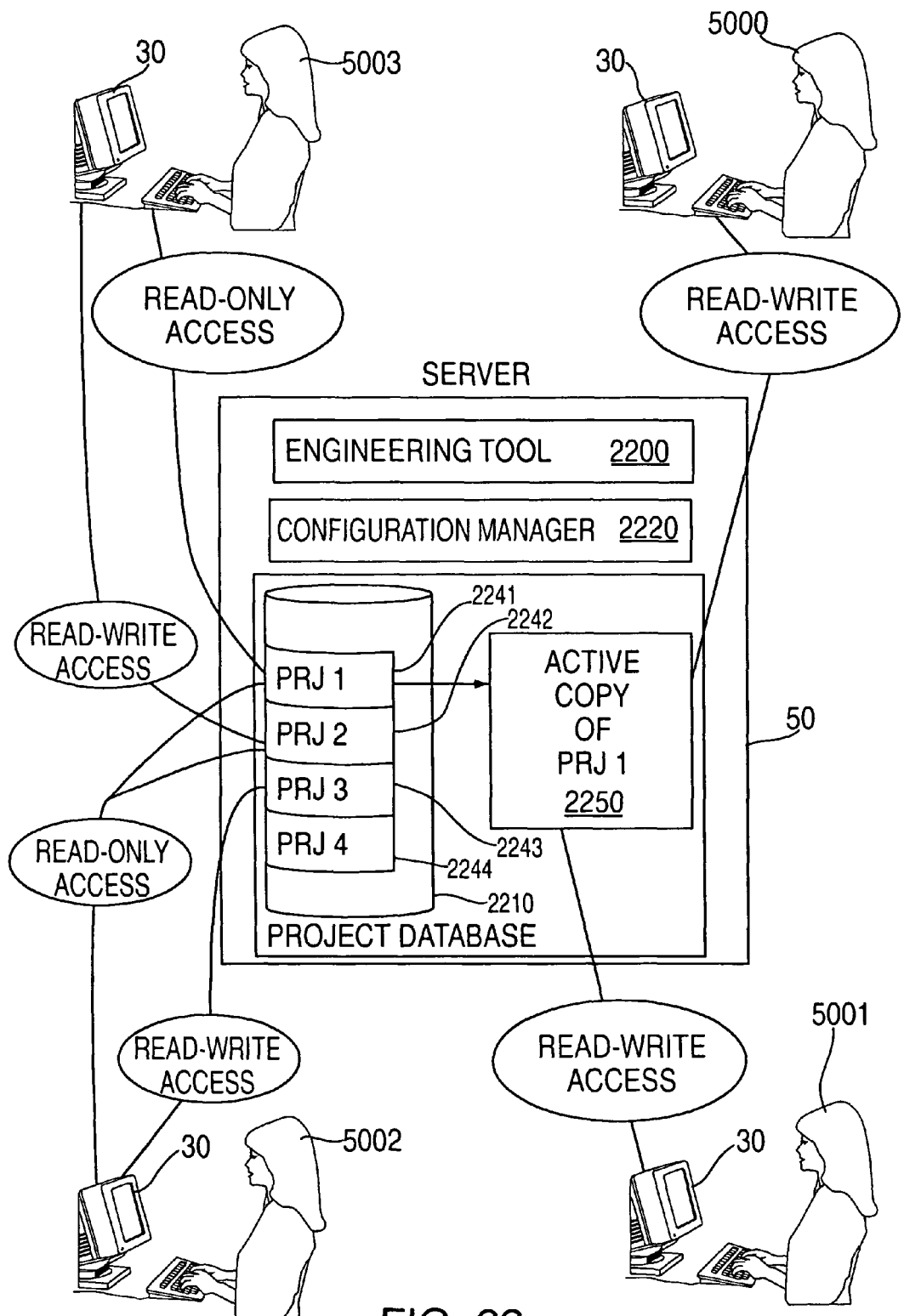
FIG. 22 illustrates a collaborative engineering system according to the present invention.

The present invention also advantageously provides a system and method for collaborative engineering. In one embodiment, multiple users may access and develop jointly the programming code for one or more programmable controllers. As is shown in FIG. 22, a plurality of users may access a server. A web-enabled engineering tool 2200 resides on the server 50 and is capable of running in a browser application on the client devices 30. The server may contain a memory for storing engineering projects in a database 2210 as well as a configuration manager 2220. The projects stored in the project database 2210 may be discrete projects or they may be related. Typically, the user that created a particular project or piece of code is granted full read and write rights to that project. As shown in FIG. 22, a first user 5000 may access a first project 2241. Upon accessing the first project 2241, which is typically a document storing programming code in a human readable form, an active copy 2250 of the first project is created on the server 50. With the aid of the web-enabled engineering tool 2200, the first user 5000 may modify the active copy of the first project 2250. Other users 5001, 5002, 5003 on the system, may need to view a copy of project 1. This is quite often the case when a second and third user are working on related projects. Since an active copy is work in progress it is possible that the first user 5000 may never save the changes the first user 5000 is making to the active copy, it would not typically not be advantageous to grant the second and third users rights to read the active copy. Instead, it is often preferable to grant the second and third users 5002, 5003 read rights to the archived copy residing on the project database. In some embodiments, it may be advantageous to provide a fourth user 5001 with either read rights or read-write rights to the active copy. This may be particularly useful where the fourth user 5001 is a customer service representative, a consultant or supervisor overseeing of the users. Access to the archived copies of the projects stored in the database as well as access to the active copy are generally controlled by a configuration manager. In an embodiment of the present invention, the creator of a project grants rights to other users through the configuration manager 2220. Often at least one other user, such as a supervisor or IT administrator, has the ability to grant rights.

In one embodiment, such as the one depicted in FIG. 22, a large programming task is divided into several smaller projects. Each project is stored as a document in the projects database. Each user is primarily responsible for a separate project. The first user 5000, for example, is in charge of project 1 2241. Thus, the first user 5000, via the configuration manager, is granted read and write rights to the first project 2241. Other users, such as the second and third users 5002, 5003 may be in charge of separate projects or related projects and are thus granted lesser rights to project 1, such as read only rights. The second user 5002 is tasked with creating project 2 2242 and is thus granted full rights to project 2, but users 1 and 3 are given only read-rights to an archived copy of project 2. User 3 5003 is tasked with creating project 3 2243 and is thus granted read-write rights to project 3 but read-only rights to archived copies of projects 1 and 2. Likewise, the first user 5000 is granted read-only rights to archived copies of projects 2 and 3. A project supervisor, such as the fourth user 5001, may be given supervisory rights, which may include the right to read and write to active copies, as well as archived copies, the right to combine various projects (either the active copies or the archived copies, into one piece of programming code, the right to compile the programming code, and any other rights needed to oversee a programming project.

Figure 26:
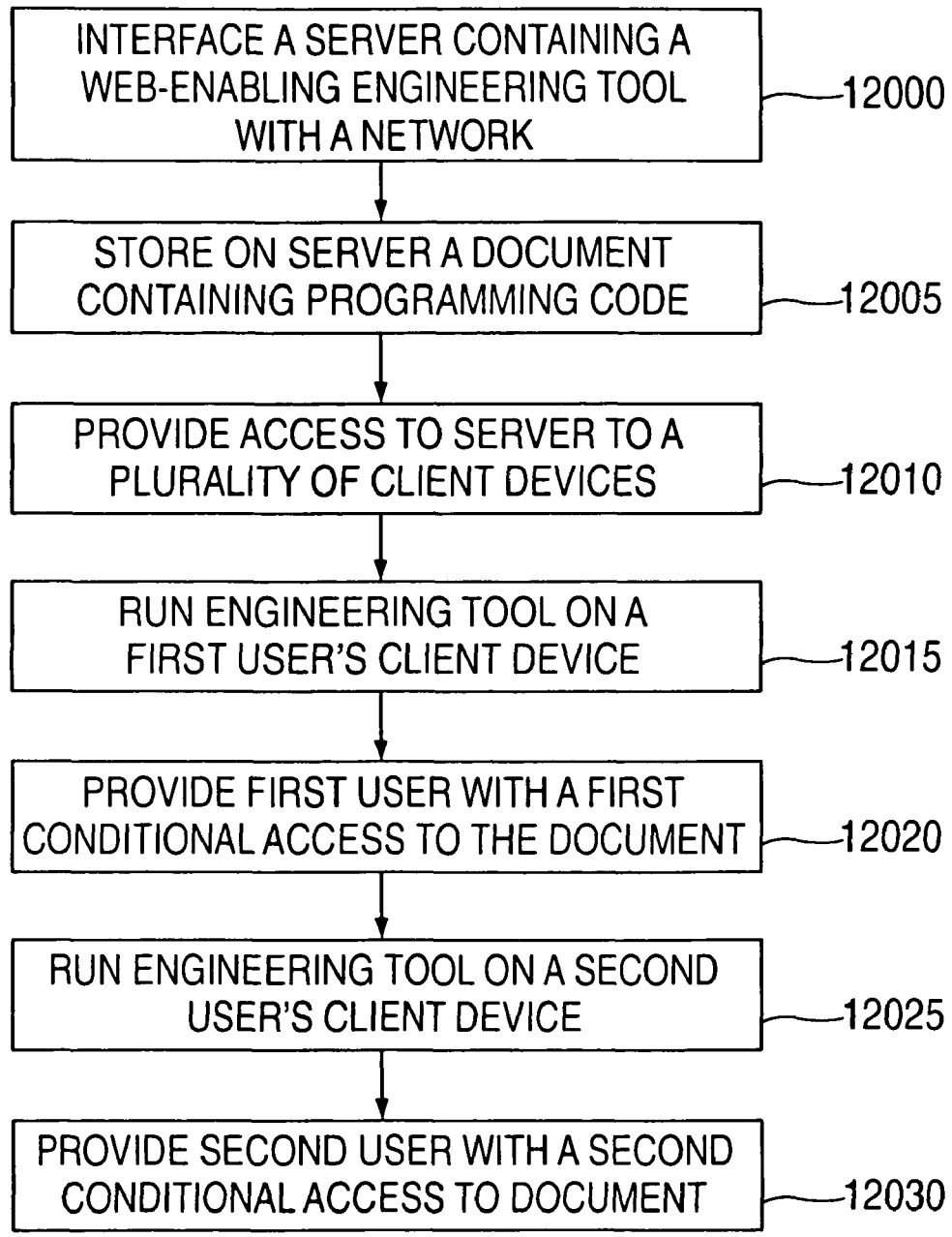
FIG. 26 is a flowchart outlining a collaborative engineering method enabled by the present invention.
Figure 27:
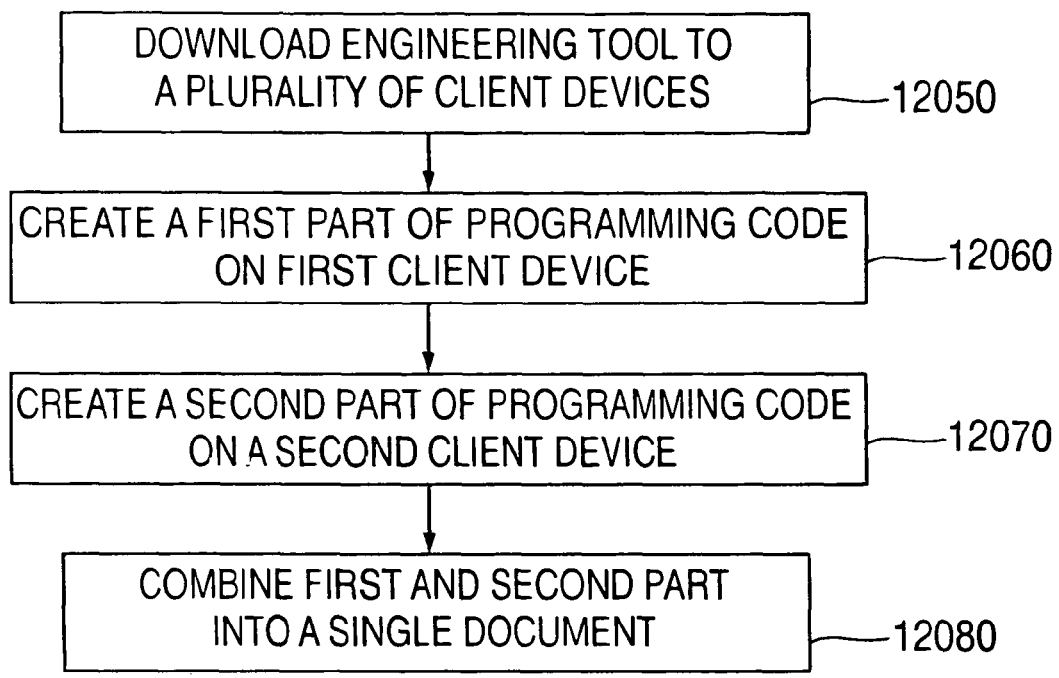
FIG. 27 is a flowchart outlining an alternative collaborative engineering method according to the present invention.
Figure 28:
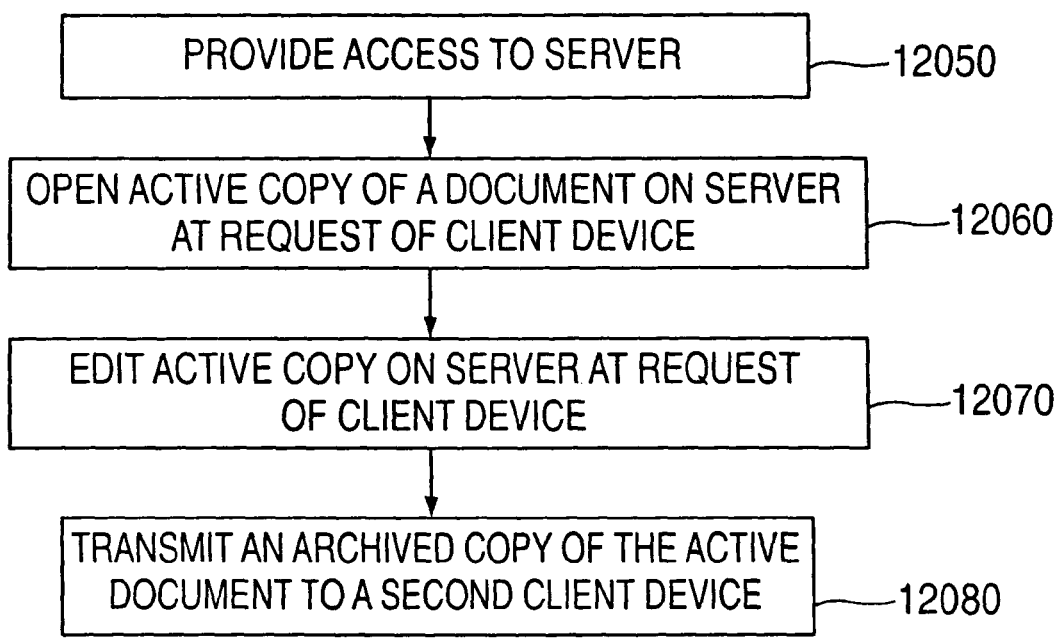
FIG. 28 is a flowchart outlining another alternative collaborative engineering method according to the present invention.

The present invention therefore enables numerous methods for collaboratively programming programmable controllers and generating configuration data for I/O networks and devices, which is usually part of the programming process. FIG. 26-28, outline a few examples of some of the many collaborative engineering methods and techniques enabled by the present invention. While specific examples are shown in these drawings, the method steps that are outline here are intended to be illustrative and not exhaustive of the broad and robust collaborative engineering methods enabled by the present invention.

The present invention also provides for convenient archiving of programming code and version management. A version manager or version management system may be incorporated into the configuration manager or controlled by the configuration manager. Before new compiled programming code is downloaded to a programmable controller (either directly from the server to the controller or from the server to the controller via the client device), a copy of the existing code is archived on the server. In some embodiments, the programming code is archived in a human-readable form before it is compiled. The compiled code and human-readable code may be linked together so that the human readable code may be accessed based on the compiled code. (See e.g. FIG. 20).

A version management tool residing on the server would provide several advantages and provide a new business model for engineering tool suppliers. One of the many advantages it provides is that a customer may search for a specific change to a program or may compare two versions of a program. This is highly desirable in industries regulated by the Food and Drug Administration ("FDA"). For example, in a food plant the FDA requires that all changes to a PLC program be documented. A version management tool may provide this functionality. In some embodiments, the version management tool is part of a configuration manager and resides on a server with an engineering tool. In a typical scenario, a user makes a change to a PLC program (e.g. version 1.0), for example to increase the amount of sugar in a mix. The modified program along with the documentation is saved as a new version (e.g. version 1.1) on the server. If at some later point in time, it is determined that the product is too sweet, a subsequent user can correct this by searching for changes to the PLC that affected the sweetness or the quantity of sugar added to the product. The version manager preferably supports this functionality. Often, it is not possible to revert to the original version (e.g. 1.0) because there have been subsequent changes, but the user can create a new version by making changes to the existing version running on the PLC.

In addition to providing searching functions, the version management tool may also provide comparing functions that allow a user to compare one version to another to show changes. The compare function may work in both graphical and text based programming languages and preferably highlights the changes.

Figure 23:
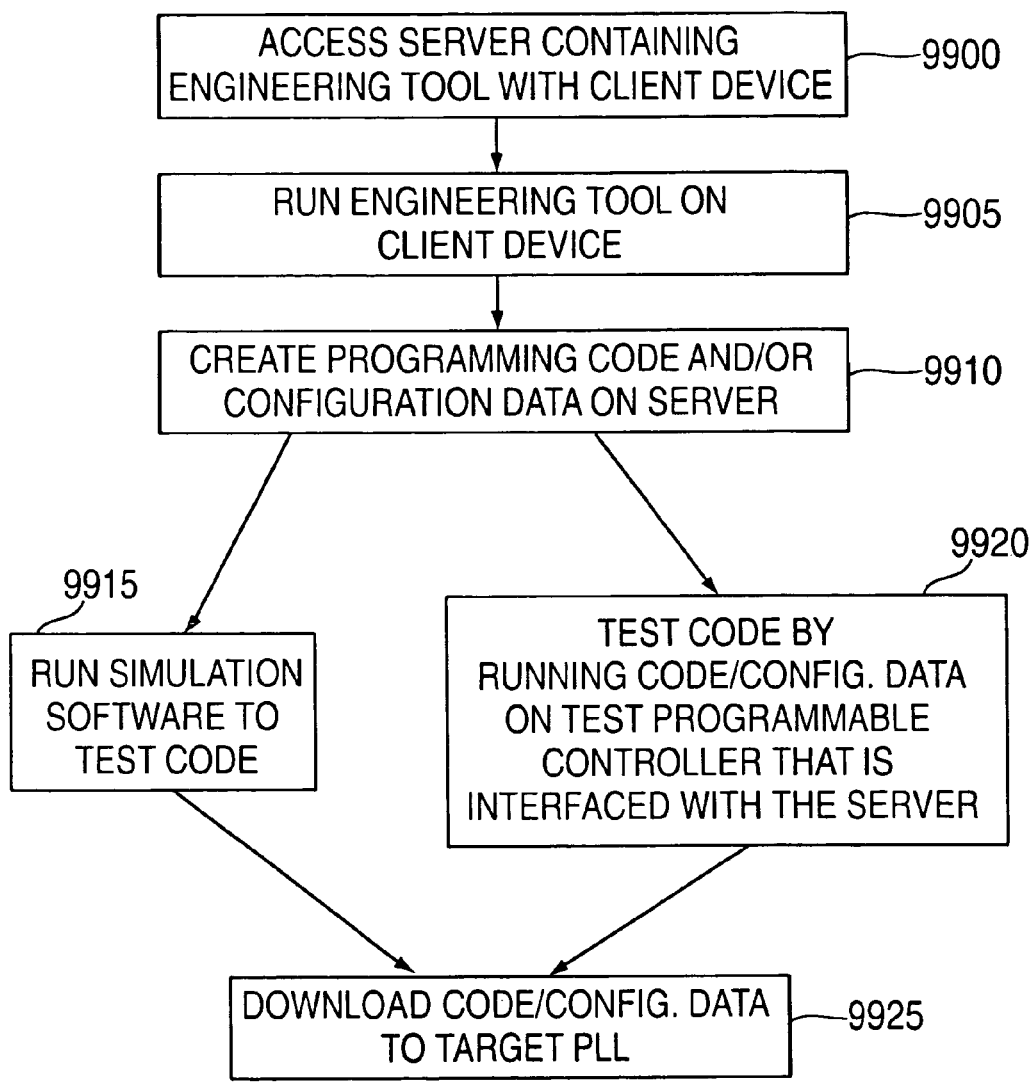
FIG. 23 is a flowchart outlining a method of developing and testing programming code for programmable controller and/or configuration data, according to the present invention.

The present invention also provides a method and system for testing programming code developed on a central server. As is shown and outlined in FIG. 23, a server containing an engineering tool is accessed with a client device, step 9900. The engineering tool is then operated on the client device, step 9905, preferably in a browser application on the client device, and programming code is then created on the server, step 9910. The programming code may then be tested by running simulation software on the server, step 9915. The simulation software may mimic an actual programmable controller. In other embodiments, the server may be interfaced with a testing programmable controller, step 9920. Preferably, the testing programmable controller is configured to test programming code and/or configuration data generated with the engineering tool on the server. After the programming code is tested, it may be downloaded to an actual programmable controller, step 9925, which is often referred to as the target programmable controller.

Figure 24:
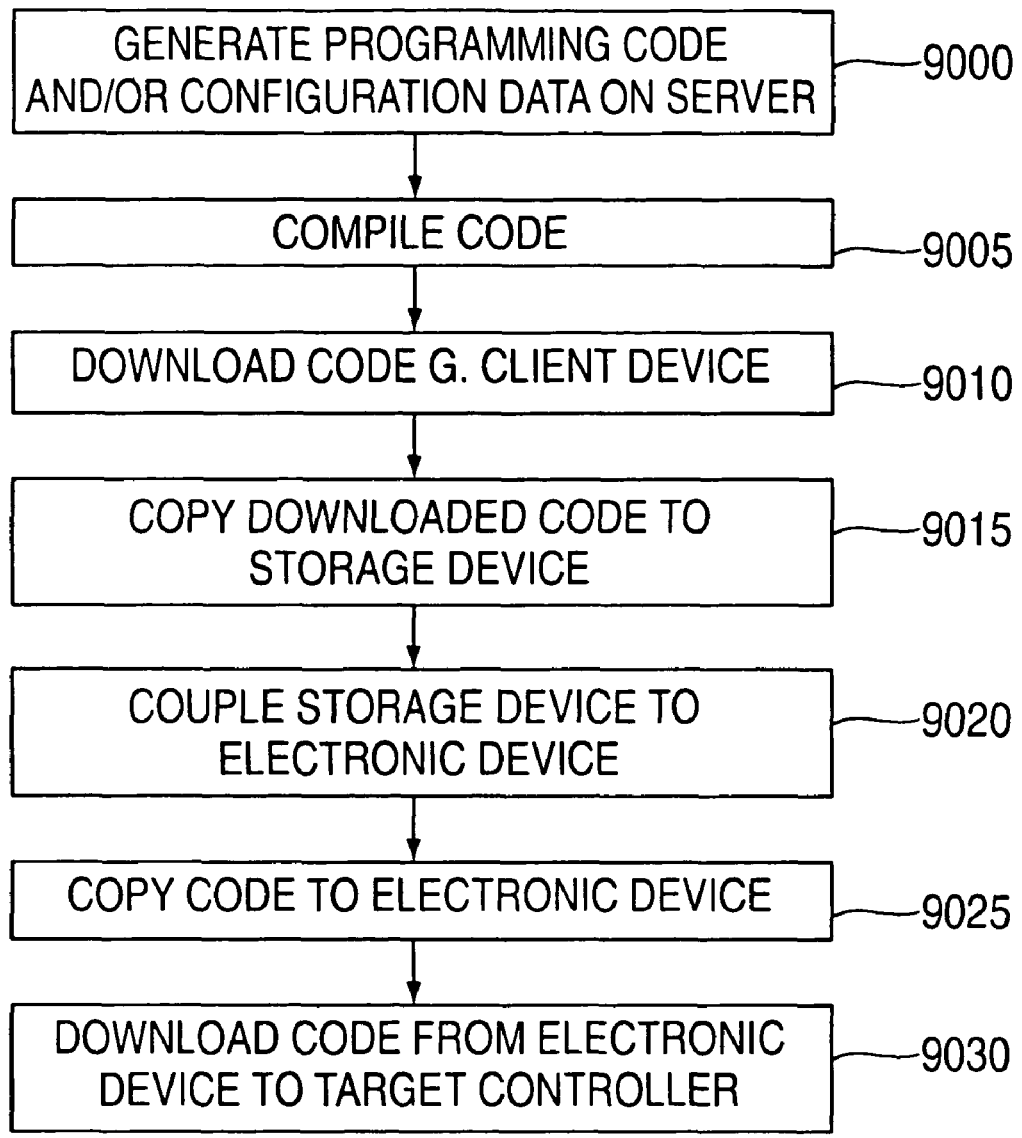
FIG. 24 is a flowchart outlining a method for generating and installing programming code on a programmable controller, according to the present invention.

One method of downloading code generated by the present invention is outline in FIG. 24. Programming code and/or configuration data is generated on a server, step 9000. The code is then compiled, step 9005. It is then downloaded to a client device, step 9010. And copied to a storage device that is associated with the client device, step 9015. The storage device may take many forms and may be a removable storage device, such as a disk drive or flash memory unit. The storage device may be interfaced or communicatively coupled with an electronic device, step 9020. The code may then be copied to the electronic device, step 9025. From the electronic device, the code may then be downloaded to a target programmable controller, step 9030.

Figure 25:
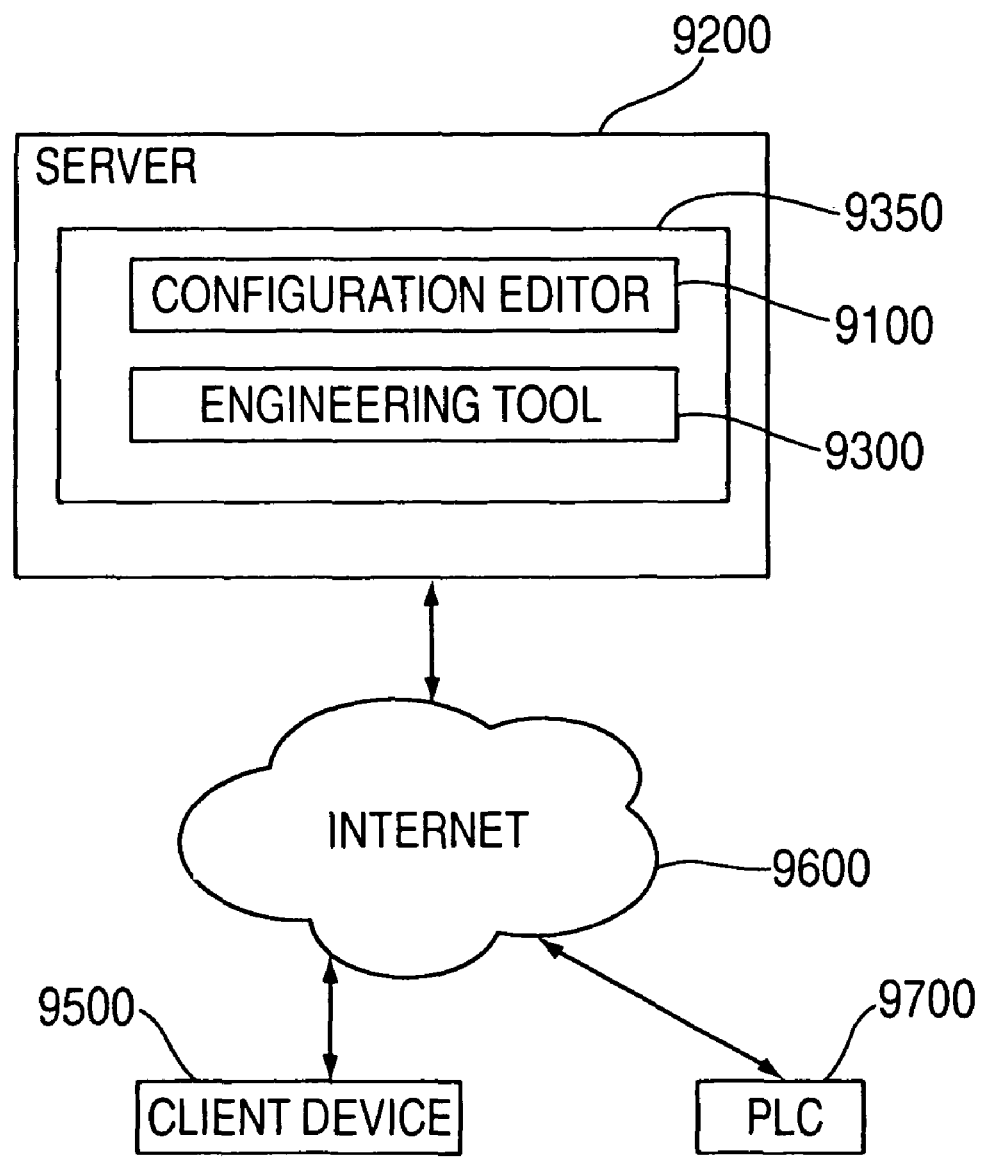
FIG. 25 illustrate one embodiment of the present invention wherein an engineering tool set reside on a server, contains a configuration editor, and is invokable by a client device over a network.

As is shown in FIG. 25, the present invention may also comprise a configuration editor 9100 for generating code or data for configuring I/O networks and devices that resides on a server 9200. A configuration editor usually part of the engineering tool 9300 or part of an engineering tool set 9350. Those skilled in the art will recognize that in most cases the engineering tools described herein may contain a configuration editor and the generating of programming code may comprise the generation of configuration data. The configuration editor may take may forms, but is usually graphical and is preferably adapted to be invokable by a client device 9500 over a network 9600, such as the internet. A graphical configuration editor may show the topology of an I/O network and the device on the network. Configuration data for I/O networks and devices is typically downloaded to a programmable controller 9700 on the network. In some cases, the data may be downloaded to intelligent devices on the network. Configuration data often comprise information such as baud rates and information relating to the mapping of logical to physical I/O.

The present invention, although described above with reference to specific embodiments, may be embodied in numerous forms, too many to describe herein, and should not be limited by the above described exemplary embodiments, which are illustrative of the present invention, but not exhaustive. For example, those skilled in the art will also recognize that although the method steps of the present invention are discussed above in a specific order, it is often the case that the order of the steps is not critical and the invention may be practiced by performing the steps in differing order. For example, it is often immaterial to the practice of the present invention whether the method steps are performed in any particular order. For example, it makes no difference if value is conveyed by a customer before or after downloading compiled code and configuration data to a PLC from a central server.

What is claimed is:

1. A system for configuring I/O networks and devices comprising:
    a server communicatively coupled to a network; and
    a configuration editor residing on the server, the configuration editor adapted to be invokable by a client device that is communicatively coupled to the network, the configuration editor adapted to map a logical I/O area of a programmable logic controller to a physical I/O area of the programmable logic controller, the programmable logic controller controlled via programming code adapted to cause the programmable logic controller to control field-based actuators, the configuration editor comprised by an engineering tool adapted to create an XML version of the programming code, the engineering tool residing on the server.

2. The system of claim 1, wherein the network is the Internet.

3. The system of claim 2, further comprising the engineering tool for developing the programming code for the programmable logic controller.

4. The system of claim 1, wherein the client device comprises a personal computer.

5. The system of claim 1, wherein the client device comprises a PDA.

6. The system of claim 1, wherein the client device comprises a cellular telephone.

7. The system of claim 1, further comprising a version management tool that resides on the server.

8. The system of claim 7, wherein the version management tool is part of a configuration manager.

9. The system of claim 1, further comprising a version management tool for managing versions of the programming code for the programmable logic controller, the server having the version management tool installed thereon, the version management tool invokable by the client device over the network, and a plurality of versions of the programming code residing on the server.

10. The system of claim 9, wherein the version management tool is part of a configuration manager that resides on the server.

11. The system of claim 9, wherein the version management tool comprises an application for searching for versions having predetermined attributes.

12. The system of claim 9, wherein the version management tool comprises an application for comparing two or more versions, of the plurality of versions of the programming code, with each other to show differences between the two or more versions.

13. The system of claim 9, further comprising the engineering tool residing on the server, the engineering tool configured to run on the client device in a network-interfacing-application.

14. The system of claim 13, wherein the network-interfacing-application comprises a web-browser and the network is the Internet.

* * * * *